(12) United States Patent
Itai

(10) Patent No.: US 11,659,120 B2
(45) Date of Patent: May 23, 2023

(54) IMAGE FORMING APPARATUS AND CONTROL METHOD

(71) Applicant: SHARP KABUSHIKI KAISHA, Sakai (JP)

(72) Inventor: Tsutomu Itai, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/542,747

(22) Filed: Dec. 6, 2021

(65) Prior Publication Data

US 2022/0191335 A1 Jun. 16, 2022

(30) Foreign Application Priority Data

Dec. 16, 2020 (JP) .............................. JP2020-208307

(51) Int. Cl.
*H04N 1/00* (2006.01)

(52) U.S. Cl.
CPC ....... *H04N 1/0097* (2013.01); *H04N 1/00413* (2013.01); *H04N 1/00482* (2013.01); *H04N 1/00514* (2013.01); *H04N 1/00517* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2014/0082137 A1* | 3/2014 | Matoba | ................... | H04L 67/02 709/217 |
| 2017/0078499 A1* | 3/2017 | Hoshino | ............ | H04N 1/00204 |
| 2019/0306349 A1* | 10/2019 | Shino | ................. | H04N 1/00517 |

FOREIGN PATENT DOCUMENTS

JP 2019-123197 A 7/2019

* cited by examiner

*Primary Examiner* — Frantz Bataille
(74) *Attorney, Agent, or Firm* — ScienBiziP, P.C.

(57) ABSTRACT

An image forming apparatus that executes a job, based on a setting value, and is operative to store a history of the job, as a job history includes: a storage that stores the setting value of the executed job, as setting history information; a displayer that displays a selection screen for selecting the setting history information stored in the storage; and a controller that reads the setting value included in the selected history information. The controller determines whether to display setting history information of a newly executed job, based on a comparison result between the setting value pertaining to the newly executed job and the setting value included in the setting history information.

13 Claims, 28 Drawing Sheets

FIG. 3

SETTING HISTORY INFORMATION

| JOB ID | FUNCTION | USER NAME | DOCUMENT NAME | NUMBER OF PAGES/NUMBER OF SETS | START DATE AND TIME/END DATE AND TIME | PRIORITY DISPLAY IDENTIFIER, AND THE LIKE | SETTING VALUE |
|---|---|---|---|---|---|---|---|
| 025 | PRINT | T. T | document 03 | 002/001 | 2019/12/4 10:30:50 / 2019/12/4 10:32:50 | ★ | COLOR MODE: FULL COLOR<br>PAPER SIZE: A4<br>DOCUMENT SIZE: A4<br>PAPER TYPE: PLAIN PAPER<br>NUMBER OF COPIES: 100 COPIES<br>ZOOM FUNCTION: On<br>ZOOM MAGNIFICATION: 100%<br>COPY DENSITY: AUTOMATIC<br>PAPER TRAY: No. 1 | DOUBLE-SIDED PRINTING: No<br>N-Up PRINTING: 1-1<br>FIT PAGE: Yes<br>FINISHING FUNCTION: STAPLING<br>DATA CORRECTION FUNCTION: Yes<br>COLOR MODE ADJUSTMENT FUNCTION: Yes<br>TEXT/IMAGE COMPOSITION FUNCTION: No<br>SPECIAL PRINTING FUNCTION: No |
| 024 | PRINT | T. T | document 05 | 010/001 | 2019/12/4 10:15:30 / 2019/12/4 10:17:50 | | COLOR MODE: FULL COLOR<br>PAPER SIZE: A4<br>DOCUMENT SIZE: A4<br>PAPER TYPE: PLAIN PAPER<br>NUMBER OF COPIES: 100 COPIES<br>ZOOM FUNCTION: On<br>ZOOM MAGNIFICATION: 100%<br>COPY DENSITY: AUTOMATIC<br>PAPER TRAY: No. 1 | DOUBLE-SIDED PRINTING: No<br>N-Up PRINTING: 1-1<br>FIT PAGE: Yes<br>FINISHING FUNCTION: STAPLING<br>DATA CORRECTION FUNCTION: Yes<br>COLOR MODE ADJUSTMENT FUNCTION: Yes<br>TEXT/IMAGE COMPOSITION FUNCTION: No<br>SPECIAL PRINTING FUNCTION: No |
| 023 | PRINT | S. A | document 02 | 001/001 | 2019/12/4 09:30:00 / 2019/12/4 09:31:10 | SAVE | COLOR MODE: BLACK AND WHITE<br>PAPER SIZE: A4<br>DOCUMENT SIZE: A4<br>PAPER TYPE: PLAIN PAPER<br>NUMBER OF COPIES: 100 COPIES<br>ZOOM FUNCTION: On<br>ZOOM MAGNIFICATION: 100%<br>COPY DENSITY: AUTOMATIC<br>PAPER TRAY: No. 1 | DOUBLE-SIDED PRINTING: DOUBLE-SIDED HORIZONTAL BINDING<br>N-Up PRINTING: 1-1<br>FIT PAGE: Yes<br>FINISHING FUNCTION: STAPLING<br>DATA CORRECTION FUNCTION: Yes<br>COLOR MODE ADJUSTMENT FUNCTION: Yes<br>TEXT/IMAGE COMPOSITION FUNCTION: No<br>SPECIAL PRINTING FUNCTION: No |
| 022 | SCAN | K. K | ----- | 001/ | 2019/12/4 07:30:50 / | | TEXT/PHOTO: TEXT<br>RESOLUTION: 200dpi x 200 dpi<br>DOCUMENT SIZE: A4<br>FORMAT: PDF<br>COMPRESSION METHOD: MMR(G4) | PROGRAM: No<br>FRAME ERASING: Yes<br>PAGE DIVIDING: No<br>BACKGROUND ERASING: No<br>CARD SCAN: No |

FIG. 4

JOB HISTORY INFORMATION

| JOB ID | FUNCTION | USER NAME | DOCUMENT NAME | NUMBER OF PAGES/NUMBER OF SETS | START DATE AND TIME/ END DATE AND TIME | STATUS |
|---|---|---|---|---|---|---|
| 025 | PRINT | T.T | document03 | 002/001 | 2019/12/4 10:30:50 / 2019/12/4 10:32:50 | END |
| 024 | PRINT | T.T | document05 | 010/001 | 2019/12/4 10:15:30 / 2019/12/4 10:17:50 | END |
| 023 | PRINT | S.A | document02 | 001/001 | 2019/12/4 09:30:00 / 2019/12/4 09:31:00 | END |
| 022 | SCAN | K.K | — | 010/001 | 2019/12/4 07:30:50 / 2019/12/4 07:31:30 | END |
| 021 | PRINT | T.T | document01 | 001/001 | 2019/12/4 08:30:00 / 2019/12/4 09:32:00 | END |
| . . | . . | . . | . . | . . | . . | . . |

IMAGE FORMING APPARATUS AND CONTROL METHOD

BACKGROUND OF THE INVENTION

Field of the Invention

The present invention relates to an image forming apparatus and the like.

Description of the Background Art

An image forming apparatus such as a multifunction machine executes a job using a print function, a fax function, a scan function, or the like. In executing a job, the image forming apparatus acquires, as a setting value, an input value by a user, an initial setting value specific to the apparatus, and the like. By causing the image forming apparatus to execute a job, based on an acquired setting value, the user can acquire an execution result of a desired job.

Some of the image forming apparatuses generate history information in which information relating to an executed job and a setting value pertaining to the job are associated with each other. History information including a setting value is referred to as setting history information.

In recent years, an attempt has been made to effectively utilize the setting history information. Specifically, there is a configuration in which time and effort such as an input/change of a setting value and the like are eliminated, and user's convenience is improved by reusing setting history information pertaining to an already executed job.

However, setting history information may be deleted from a storage device, when the number of generated settings exceeds a certain number, or the number of indications may be limited due to limitation of a displayable area of a display device.

In this case, when setting history information having same or partially same setting values is generated in a duplex manner by execution of a job, a user who wants to execute a job by using setting history information having a different setting value may not be able to utilize the setting history information, when executing a desired job, because the setting history information pertaining to execution is unexpectedly deleted or is not displayed on a display device.

For example, regarding handling of history information generated in a duplex manner, Japanese Unexamined Patent Application Publication No. 2019-123197 discloses a technique in which a record constituted of a plurality of items including an item relating to a plurality of attributes relating to an application, and an item relating to a time when a job is executed is created, an attribute included in a record created by a newly executed job is compared with a record registered in a record list, and a same record without a difference is overwritten at a time included in the record created by the newly executed job.

However, Japanese Unexamined Patent Application Publication No. 2019-123197 does not mention how to leave setting history information pertaining to a newly executed job according to a job execution method using setting history information.

In view of the above-described problem, an object of the present application is to provide an image forming apparatus and the like which enable to securely use setting history information pertaining to a job desired by a user according to a job execution method using setting history information.

SUMMARY OF THE INVENTION

In order to solve the above-described problem, an image forming apparatus according to the present disclosure is an image forming apparatus that executes a job, based on a setting value, and is operative to store a history of the job, as a job history. The apparatus includes: a storage that stores the setting value of the executed job, as setting history information; a displayer that displays a selection screen for selecting the setting history information stored in the storage; and a controller that reads the setting value included in the selected setting history information. The controller determines whether to display setting history information of a newly executed job, based on a comparison result between the setting value pertaining to the newly executed job and the setting value included in the setting history information.

In addition, an image forming apparatus according to the present disclosure is an image forming apparatus that executes a job, based on a setting value, and is operative to store a history of the job, as a job history. The apparatus includes: a storage that stores the setting value of the executed job, as batch setting history information; a displayer that displays a selection screen for selecting the batch setting history information stored in the storage; and a controller that reads the setting value included in the selected batch setting history information. The controller deter whether to display setting history information of a newly executed job, based on a comparison result between the setting value pertaining to the newly executed job and the setting value included in the batch setting history information.

Further, a control method according to the present disclosure is a control method for an image forming apparatus that executes a job, based on a setting value, and is operative to store a history of the job, as a job history. The control method includes: storing the setting value of the executed job, as setting history information; displaying a selection screen for selecting the setting history information stored in the storing; and controlling to read the setting value included in the selected setting history information. The controlling includes determining whether to display setting history information of a newly executed job, based on a comparison result between the setting value pertaining to the newly executed job and the setting value included in the setting history information.

Also, a control method according to the present disclosure is a control method for an image forming apparatus that executes a job, based on a setting value, and is operative to store a history of the job, as a job history. The control method includes: storing the setting value of the executed job, as batch setting history information; displaying a selection screen for selecting the batch setting history information stored in the storing; and controlling to read the setting value included in the selected batch setting history information. The controlling includes determining whether to display setting history information of a newly executed job, based on a comparison result between the setting value pertaining to the newly executed job and the setting value included in the batch setting history information.

According to the present disclosure, it is possible to provide an image forming apparatus and the like which enable to securely use setting history information pertaining to a job desired by a user according to a job execution method using setting history information.

BRIEF DESCRIPTION OF THE DRAWINGS

FIG. 3 is a diagram illustrating a configuration example of setting history information according to the first embodiment.

FIG. 4 is a diagram illustrating a configuration example of job history information according to the first embodiment.

DESCRIPTION OF THE PREFERRED EMBODIMENTS

In the following, embodiments according to the present disclosure are described with reference to the drawings. Note that, the embodiments describe, as an image forming apparatus, a multifunction machine that has a print function including copying, a fax function, a scan function, or the like, and performs processing accompanying execution of each function on the basis of a job or on the basis of a plurality of jobs in which these functions are combined one another. Also, the following embodiments are examples for describing the present disclosure, and the technical scope of description in the claims is not limited to the following description.

1. First Embodiment

A first embodiment describes, as a new job execution method, a multifunction machine provided with a setting history information selection screen that accepts selection of setting history information pertaining to a job (already executed job) that has already been executed.

1.1. Functional Configuration

Figure 1:
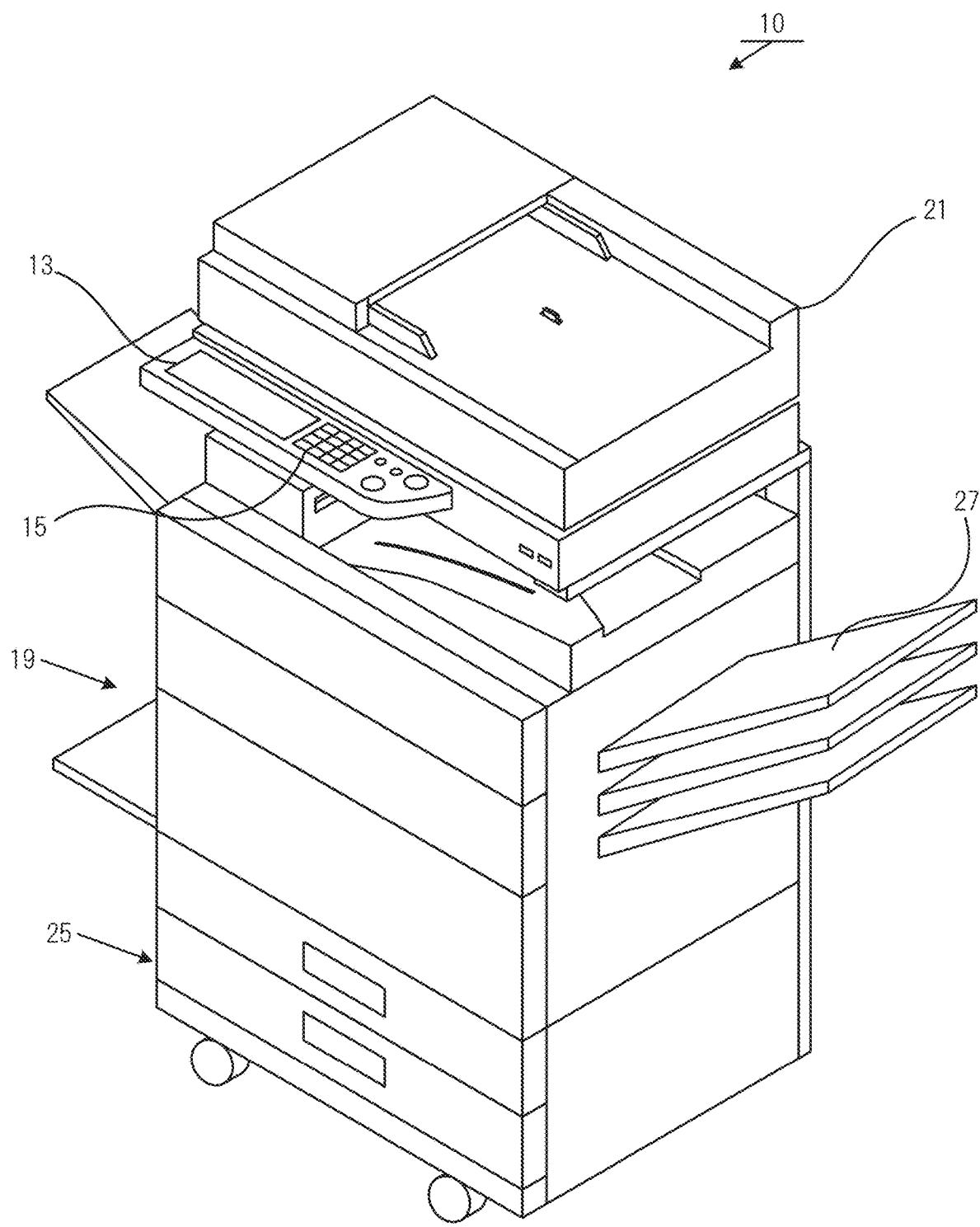
FIG. 1 is an external perspective view of a multifunction machine according to a first embodiment.
Figure 2:
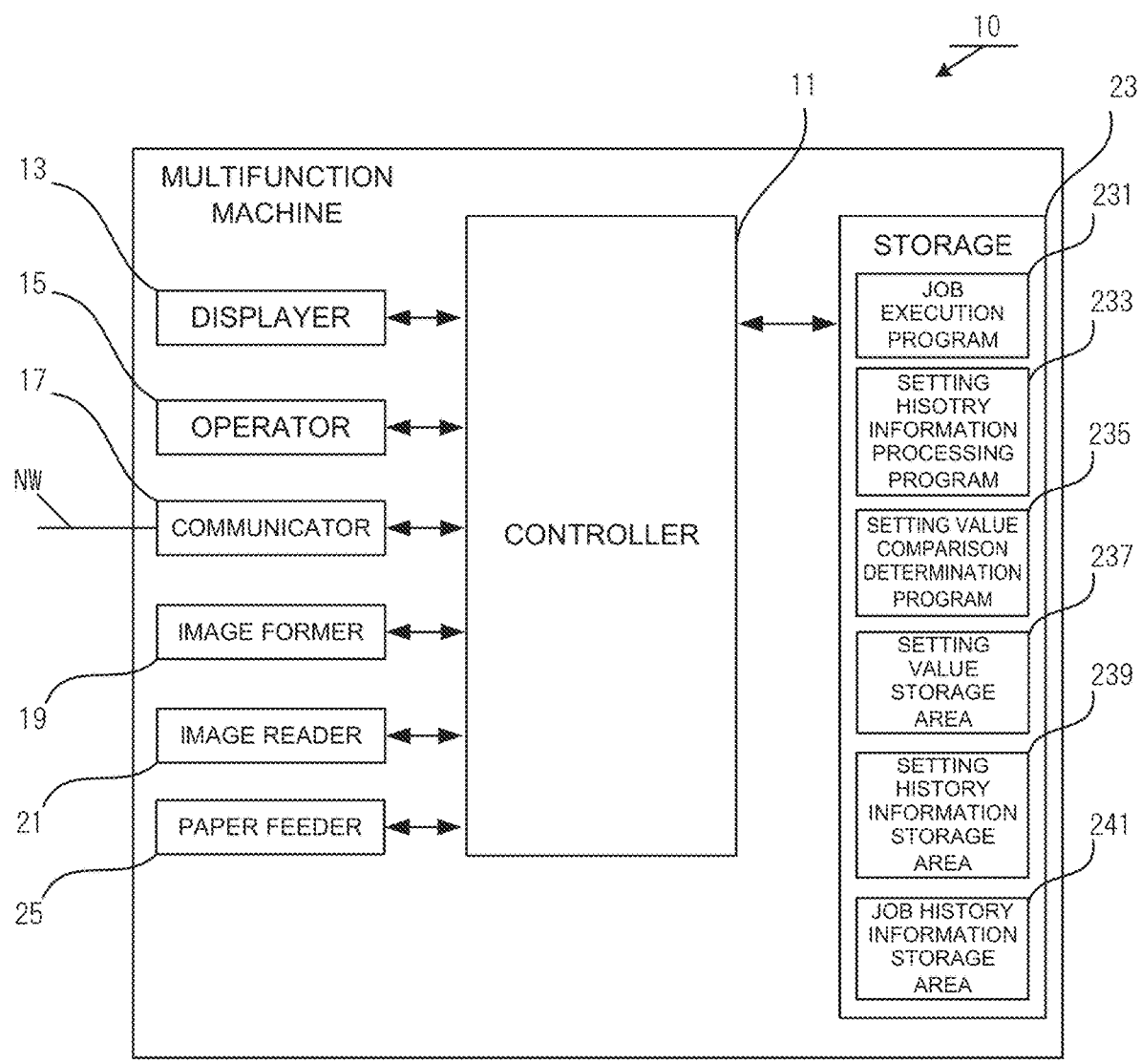
FIG. 2 is a functional configuration diagram of the multifunction machine according to the first embodiment.

A functional configuration of a multifunction machine 10 according to the first embodiment is described with reference to FIGS. 1 and 2. FIG. 1 is an external perspective view illustrating an overall configuration of the multifunction machine 10. FIG. 2 is a functional configuration diagram of the multifunction machine 10.

The multifunction machine 10 has a copy function that performs image formation of image data generated by a scan function on paper as a recording medium, and a print function (a copy function and a print function are collectively referred to as a print function) that performs image formation on paper, based on image data acquired from an external terminal device, a portable storage medium, or the like. The multifunction machine 10 also has a fax function that transmits and receives fax data via a public telephone communication network, a temporary data storage function that temporarily stores received fax data, and the like.

As illustrated in FIGS. 1 and 2, the multifunction machine 10 includes a controller 11, a displayer 13, an operator 15, a communicator 17, an image former 19, an image reader 21, a storage 23, a paper feeder 25, and a paper discharger 27.

The controller 11 controls the entirety of the multifunction machine 10. The controller 11 is constituted of, for example, one or more arithmetic devices (such as a central processing unit (CPU)). The controller 11 achieves its functions by reading and executing a job execution program 231, a setting history information processing program 233, a setting value comparison determination program 235, and the like stored in the storage 23.

The displayer 13 displays various types of information to a user. The displayer 13 can be constituted of, for example, a liquid crystal display (LCD), an organic electro-luminescence (EL) display, or the like.

The operator 15 accepts an input of information such as a setting value by a user. The operator 15 can be constituted of a hard key (e.g., a numeric keypad), a button, and the like. Note that, the operator 15 can also be constituted as a touch panel that allows an input via the displayer 13. In this case, as an input detection method of a touch panel, for example, a method such as a resistive film method, an infrared method, an electromagnetic induction method, or an electrostatic capacitance method can be employed.

The communicator 17 connects to another device via a network (NW) such as a local area network (LAN), a wide area network (WAN), the Internet, and a public telephone line network, and transmits and receives various types of information such as image data and fax data. The communicator 17 is constituted, for example, as a communicable interface, and one or both of wired connection and wireless connection can be employed as a connection method.

The image former 19 forms an image based on image data on paper. The image former 19 feeds paper from the paper feeder 25, forms an image based on image data on the paper, and thereafter discharges the paper to the paper discharger 27. The image former 19 can be constituted of a laser printer using an electrophotographic method, or the like. The image former 19 performs image formation by using toner supplied from toner cartridges associated with toner colors (e.g., yellow (Y), magenta (M), cyan (C), and black (K)).

The image reader 21 generates image data by reading an image to be read. The image reader 21 can be constituted of a scanner device or the like that converts an image into an electrical signal by an image sensor such as a charge coupled device (CCD) or a contact image sensor (CIS), and generates digital data by quantizing and encoding the electrical signal.

The paper feeder 25 has a box-shaped member (tray) for accommodating a plurality of sheets of paper in a loaded state. The tray can accommodate paper having various paper sizes and thicknesses depending on a purpose of use. The paper feeder 25 can be constituted of, for example, a plurality of trays that individually accommodate different sizes of paper, such as A4 size, B5 size, and A3 size.

The storage 23 stores various programs necessary for an operation of the multifunction machine 10, and various pieces of data. The storage 23 can be constituted of, for example, a volatile memory such as a random access memory (RAM), a non-volatile memory such as a solid state device (SSD) which is a semiconductor memory, a hard disk drive (HDD), and a read only memory (ROM).

In the first embodiment, the storage 23 stores the job execution program 231, the setting history information processing program 233, and the setting value comparison determination program 235, and secures a setting value storage area 237, a setting history information storage area 239, and a job history information storage area 241.

The job execution program 231 is a program to be read by the controller 11 so as to perform processing accompanying execution of a print function, a fax communication function, a scan function, or the like on the basis of a job. By reading the job execution program 231, the controller 11 controls each unit associated with execution of the job.

The setting history information processing program 233 is a program to be read by the controller 11, for example, when acquisition of a setting value and the like pertaining to job execution, generation of setting history information, processing with respect to setting history information, an instruction to the displayer 13 to display setting history information selection screen and the like, generation of job history information, or the like is performed.

The setting value comparison determination program 235 is a program to be read by the controller 11, when comparison determination processing between a setting value acquired by execution of a new job, and a setting value pertaining to an already executed job and included in setting history information is performed.

The setting value storage area 237 is a storage area that stores various setting values pertaining to job execution. Setting values according to the first embodiment include a setting value set by a user in execution of each job, an apparatus initial value held by an apparatus itself, and the like.

Note that, a setting value may be a value directly inputted by a user via a touch panel or the like displayed on the operator 15 or the displayer 13. Also, when the multifunction machine 10 is connected to an unillustrated external terminal device or the like via the communicator 17, the controller 11 can acquire a setting value input via a control program such as a printer driver introduced in the external terminal device. The controller 11 stores an acquired setting value in the setting value storage area 237.

The setting history information storage area 239 is a storage area that stores setting history information in a data table format. Setting history information according to the first embodiment is history information acquired by attaching, to information constituted of combination of a part or all of setting values stored in the setting value storage area 237, and history information pertaining to job execution such as a job function, a name of an executing user, and an execution date and time, an ID (job ID) for uniquely identifying the information.

Herein, each item of setting history information according to the first embodiment is described using FIG. 3. FIG. 3 is a configuration example in a case where setting history information is stored in a data table format. Herein, job ID is an ID that uniquely identifies setting history information associated with a job. Function means a job function such as a print function, a fax function, or a scan function. User name is a name of an executing user of a job. Document name is text information for determining a document optionally set by a user or the like. Number of pages/number of sets is the number of pages or a number of sets of documents provided for the job. Start date and time/end date and time is a start date and time and an end date and time of job execution.

Priority display identifier and the like are an identifier (e.g., text information such as a star mark (*) or "save") that a user himself or herself attaches to setting history information to which the user pays attention (e.g., setting history information that the user wants to preferentially display by adding a mark to those having a specific setting history).

Setting value is a setting value stored in the setting value storage area 237. Any setting value included in setting history information can be selected, as far as the setting value is a setting value stored in the setting value storage area 237. Setting values illustrated in FIG. 3 are an example in which a setting value whose frequency of change by a user is supposed to be high, and a setting value whose frequency of change is not so high, but which is supposed that a desired job execution result cannot be acquired unless the user recognizes a fact that the setting value has been changed are optionally selected as setting values.

For example, in setting history information pertaining to a print job having the job ID "#025", in the left column of setting values, setting value items such as "color mode", "paper size", "document size", "paper type", "number of copies", "zoom function", "zoom magnification", "copy density", and "paper tray" are displayed. These setting value items are an example in which setting value items whose frequency of use by a user is supposed to be high are selected.

On the other hand, in the right column of setting value items, setting value items such as "double-sided printing", "N-Up printing", "fit page", "finishing function", "data correction function", "color mode adjustment function", "text/image composition function", and "special printing function" are displayed. These setting value items are an example in which a setting value item whose frequency of change is not so high, but which is supposed that a desired job execution result cannot be acquired unless the user recognizes a fact that the setting value has been changed is selected.

As described above, it is possible to select, as a setting value included in setting history information, any setting value stored in the setting value storage area 237. However, in order to enable comparison determination of setting values, it is assumed that a common setting value is used for a setting value pertaining to a newly executed job and a setting value included in setting history information pertaining to an already executed job.

Referring back to FIG. 2, the job history information storage area 241 is a storage area in which job history information is stored in a data table format illustrated in FIG. 4. Job history information according to the first embodiment is job execution record information including a job ID, a function, a user name, a document name, the number of pages/number of sets, a start date and time/end date and time, and a status. The controller 11 displays, on the displayer 13, an item included in generated job history information, as a job history. Note that, job history information according to the first embodiment may be generated after job execution, or may be generated by extracting an item necessary for generating job history information from items of setting history information after generation of the setting history information.

1.2 Flow of Processing

Figure 5:
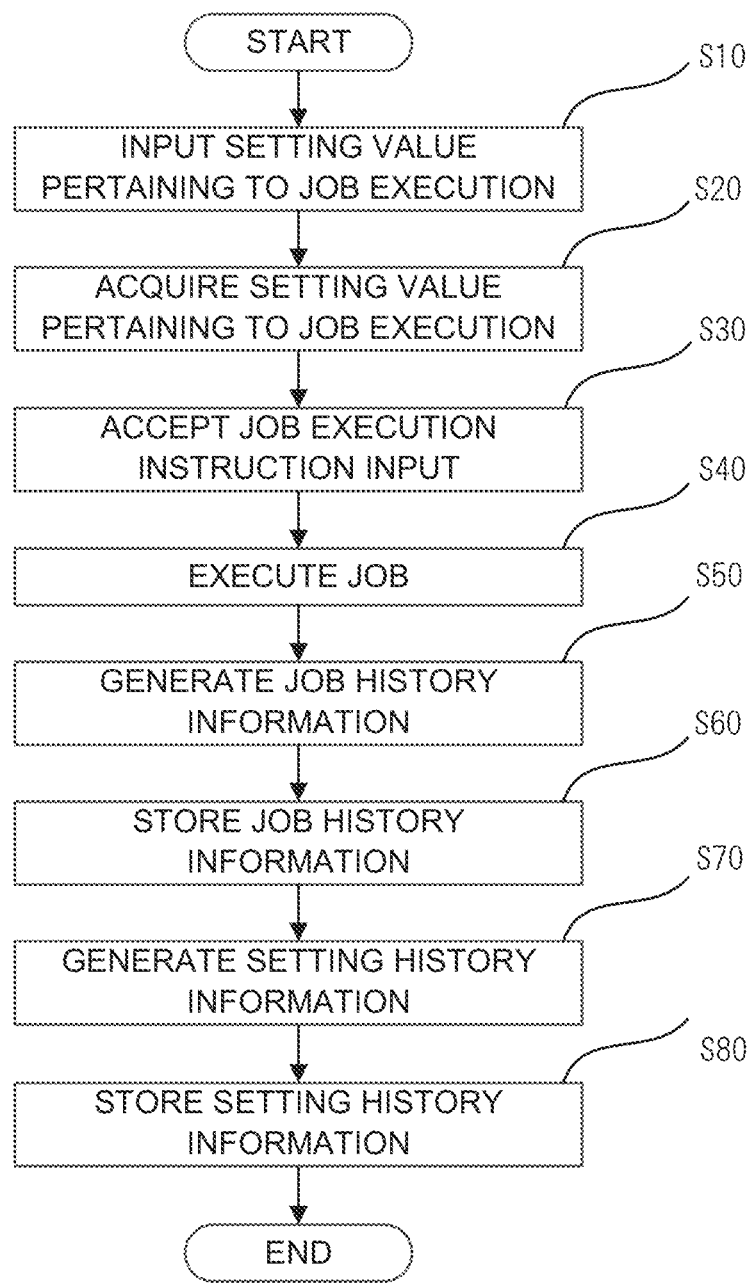
FIG. 5 is a flowchart illustrating a flow of processing of the multifunction machine according to the first embodiment.
Figure 6:
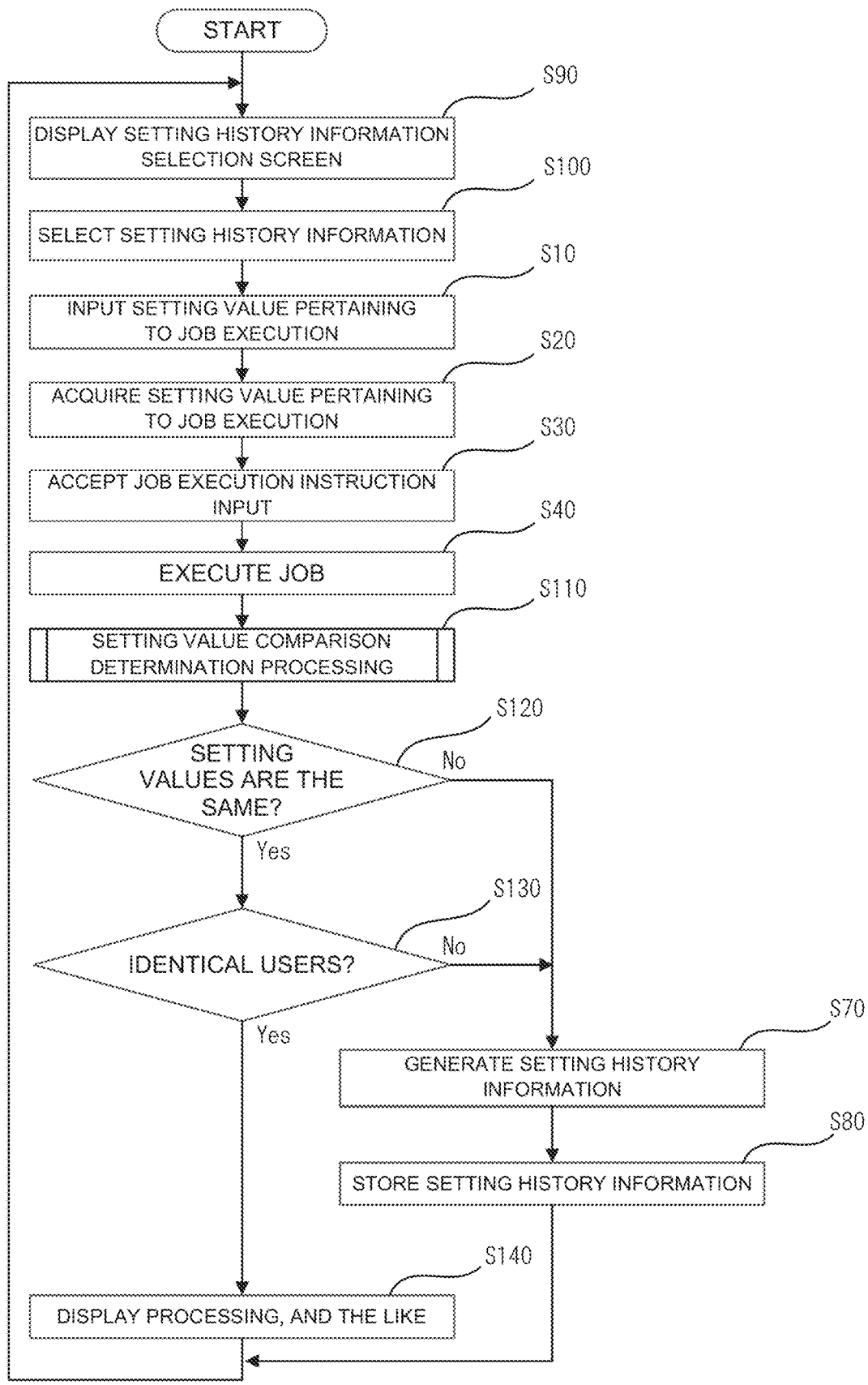
FIG. 6 is a flowchart illustrating a flow of processing of the multifunction machine according to the first embodiment.
Figure 7:
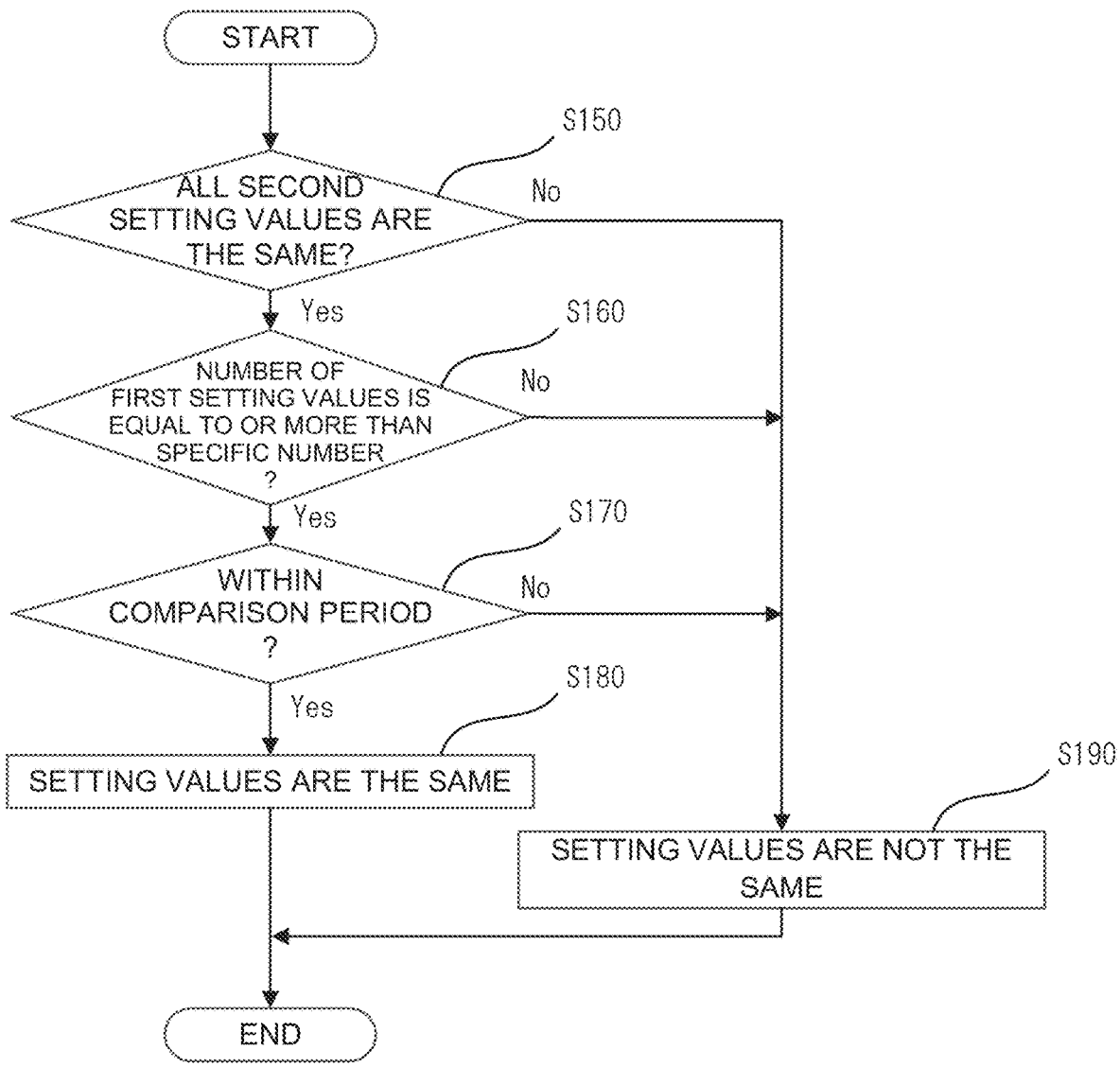
FIG. 7 is a flowchart illustrating a flow of processing of the multifunction machine according to the first embodiment.

Next, a flow of processing according to the first embodiment is described using FIGS. 5 to 7.

First, a basic flow of setting history information generation accompanying job execution is described using FIG. 5. The controller 11 performs the present processing by reading the job execution program 231 and the setting history information processing program 233.

Processing described in FIG. 5 is a processing example of processing, when a print job, a fax job, or a scan job is executed via an unillustrated dedicated setting screen. Setting history information acquired by processing in FIG. 5 is used for selection of setting history information via a setting history information selection screen described in FIG. 8, and comparison determination with respect to a setting value pertaining to a newly executed job.

Note that, description on processing in FIG. 5 is made regarding a flow in which setting history information is generated after generation of job history information. However, a generation order of job history information and setting history information may be reversed.

When a setting value pertaining to execution of a job, such as a print job, a fax job, or a scan job is input or changed by a user via a dedicated setting screen or the like, the controller 11 acquires a setting value pertaining to the job execution (step S10→step S20). The controller 11 stores the acquired setting value in the setting value storage area 237.

Note that, when a setting value is not input by the user, the controller 11 may acquire an initial value specific to the apparatus, as a setting value.

In step S30, the controller 11 accepts a job execution instruction input by receiving pressing of an unillustrated start button or the like on the operator 15, the displayer 13, or the like.

In step S40, the controller 11 executes a print job, a fax job, a scan job, or the like, based on a setting value acquired in step S20.

In step S50, the controller 11 generates job history information (see FIG. 4) pertaining to an executed job. Next, in step S60, the controller 11 stores the generated job history information in the job history information storage area 241. The job history information stored in the job history information storage area 241 can be used for displaying a job history and the like.

In step S70, the controller 11 reads a setting value pertaining to an executed job from the setting value storage area 237. The controller 11 generates setting history information by attaching, to information constituted of combination of a read setting value, and history information pertaining to job execution such as a job function, a name of an executing user, and an execution date and time, an ID for uniquely identifying the information (see FIG. 3). Next, in step S80, the controller 11 stores the generated setting history information in the setting history information storage area 239. The setting history information stored in the setting history information storage area 239 can be used for selecting setting history information via a setting history information selection screen to be described in the next drawing.

Next, processing after execution of a job based on setting history information accepted via a setting history information selection screen is described using a flowchart in FIG. 6. Note that, same processing as that in FIG. 5 is designated with a same step number.

Note that, the controller 11 performs the present processing by reading the job execution program 231, the setting history information processing program 233, and the setting value comparison determination program 235.

In step S90, the controller 11 reads setting history information from the setting history information storage area 239, and displays the setting history information on the screen of the displayer 13. Herein, setting history information to be read from the setting history information storage area 239 includes setting history information stored in step S80 in FIG. 5, and setting history information generated in the past by processing in FIG. 5.

Note that, there is no particular limitation on the number of pieces of setting history information to be read from the setting history information storage area 239 by the controller 11. The number of indications of setting history information can be set or changed as necessary according to a displayable area of the displayer 13. In addition, the user can recognize setting history information to be displayed on the screen together with a job execution history by, for example, displaying the setting history information in chronological order starting with a newest one in the order of job execution.

In step S100, the user selects desired setting history information, as setting history information pertaining to an already executed job.

When setting history information is selected by the user, the controller 11 displays, on the screen, a setting value included in the setting history information.

When a setting value pertaining to execution of a job such as a print job, a fax job, or a scan job is input or changed by the user, the controller 11 acquires a setting value pertaining to the job execution (step S10→step S20). The controller 11 stores the acquired setting value in the setting value storage area 237.

In step S30, the controller 11 accepts a job execution instruction input by receiving pressing of an unillustrated start button or the like on the operator 15, the displayer 13, or the like.

In step S40, the controller 11 executes, as a new job, a job such as a print job, a fax job, or a scan job, based on a setting value acquired in step S20.

Next, in step S110, the controller 11 performs setting value comparison determination processing.

When, as a result of setting value comparison determination processing, a setting value pertaining to a newly executed job and a setting value pertaining to setting history information of an already executed job selected in step S100 are the same (step S120; Yes), the controller 11 determines whether an executing user pertaining to the newly executed job and an executing user pertaining to the setting history information of the already executed job are the same.

When the controller 11 determines that the executing user pertaining to the newly executed job, and the executing user pertaining to the already executed job are the same (step S130; Yes), the controller 11 performs display processing and the like with respect to setting history information (step S140).

Note that, "display processing and the like" in the present disclosure means an act of generating and storing one of two pieces of setting history information in which setting values are the same, an act of doing nothing (neither generating nor storing setting history information), an act of not displaying setting history information, and the like, and includes deletion from the setting history information storage area 239. For example, when the user pertaining to job execution is the same user (when a determination result in step S130 is Yes), the controller 11 is allowed not to generate setting history information pertaining to a newly executed job, and not to store setting history information in the setting history information storage area 239. Also, the controller 11 can compile setting history information by, for example, updating an execution date and time of setting history information pertaining to an already executed job to an execution date and time of a newly executed job, and storing and displaying the setting history information, without making setting history information pertaining to a newly executed job, as a target for screen display (hereinafter, the present processing is also referred to as compiling processing).

When a setting value pertaining to a newly executed job and a setting value pertaining to setting history information of an already executed job are not the same (step S120; No), specifically, when a setting value of setting history information pertaining to an already executed job is changed, or when a setting value pertaining to a newly executed job and a setting value of setting history information pertaining to an already executed job are the same (step S120; Yes), but executing users are not the same (step S130; No), the controller 11 generates and stores setting history information pertaining to the newly executed job (step S70→step S80).

Then, the controller 11 returns the processing to step S90.

Next, setting value comparison determination processing pertaining to step S110 in FIG. 6 is described using FIG. 7.

Herein, determination parameters for use in comparison determination processing are described.

1.3 Regarding Determination Parameters in Comparison Determination Processing The first embodiment describes a configuration in which comparison determination processing is performed by roughly classifying setting values to be compared into two groups, namely, a group of first setting values and a group of second setting values. Herein, description is made based on a premise that a first setting value is a setting value whose frequency of change by a user is supposed to be high, and a second setting value is a setting value whose frequency of change is not so high, but which is supposed that a desired job execution result cannot be acquired unless the user recognizes a fact that the setting value has been changed.

Since a second setting value is a setting value whose frequency of change by the user is supposed to be not so high, there is a high probability that a second setting value pertaining to a newly executed job and a second setting value in setting history information pertaining to an already executed job are the same. Therefore, when even one of setting values included in the second setting values is different among the setting values, the controller 11 determines that a setting value pertaining to a newly executed job and a setting value in setting history information pertaining to an already executed job are not the same.

On the other hand, unlike the second setting value, since the first setting value is a setting value whose frequency of change by the user is supposed to be high, there is a high probability that a first setting value pertaining to a newly executed job and a first setting value in setting history information pertaining to an already executed job are not the same. However, in a configuration in which the controller 11 determines that a first setting value pertaining to a newly executed job and a first setting value in setting history information pertaining to an already executed job are not the same, when even one of setting values included in the first setting values is different among the setting values, convenience may be adversely affected. Therefore, in the first embodiment, when the number of first setting values is equal to or more than a specific number among the setting values, the setting values are determined to be the same. Note that, the specific number can be set to any specific number via a predetermined setting screen.

In addition, by setting a comparison period for comparison determination between a setting value pertaining to a newly executed job and a setting value in setting history information pertaining to an already executed job, specifically, a determination period for determining whether an already executed job to be compared is executed within a predetermined period of time after execution of a new job, it is possible to determine whether setting history information including the setting value pertaining to the newly executed job is present in the past.

The controller 11 performs setting value comparison determination processing by using the above-described determination parameters (see FIG. 7).

When the processing is started, the controller 11 compares a setting value pertaining to a newly executed job with a setting value pertaining to setting history information of an already executed job.

First, the controller 11 performs comparison regarding setting values included in the second setting values. Note that, the second setting value is a setting value whose frequency of change by the user is supposed to be not so high. In the first embodiment, for example, setting values such as "double-sided printing", "N-Up printing", "fit page", "finishing function", "data correction function", "color mode adjustment function", "text/image composition function", and "special printing function" correspond to the second setting values.

When the second setting values are the same (step S150; Yes), the controller 11 performs comparison regarding setting values included in the first setting values. Note that, in the first embodiment, setting values such as "color mode", "paper size", "document size", "number of copies", "zoom function", "paper tray", "paper discharge tray", and "paper feeding method" correspond to the first setting values. When the number of first setting values is equal to or more than a specific number among the setting values (step S160; Yes), the controller 11 determines whether an already executed job to be compared is the one that is executed within a predetermined period of time after execution of a new job.

When an already executed job to be compared is the one that is executed within a predetermined period of time after execution of a new job (step S170; Yes), the controller 11 determines that the setting value pertaining to the newly executed job and the setting value pertaining to setting history information of the already executed job are the same (step S180).

On the other hand, when the second setting values are not the same (step S150; No), the controller 11 determines that the setting value pertaining to the newly executed job and the setting value pertaining to the setting history information of the already executed job are not the same. Also, when the second setting values are the same (step S150; Yes), but the number of the first setting values is not equal to or more than a specific number among the setting values (step S160; No), and when the already executed job to be compared is not the one that is executed within the predetermined period of time after execution of the new job (step S170; No), the controller 11 determines that the setting value pertaining to the newly executed job and the setting value pertaining to the setting history information of the already executed job are not the same (step S190).

In this way by classifying setting values to be compared into a plurality of groups, and performing comparison determination of setting values for each group, there is no need of making comparison among all of the setting values. It is needless to say that the present disclosure does not deny a configuration in which setting values to be compared are constituted of a single group. In some job functions, the number of setting values to be compared may be less. In this case, it is also possible to configure setting values to be compared as a single group.

1.4 Operation Example

Next, an operation example of the multifunction machine 10 according to the present embodiment is described using FIGS. 8 to 14. The present operation is equivalent to processing of step S90 in FIG. 6 to step S190 in FIG. 7.

Figure 8:
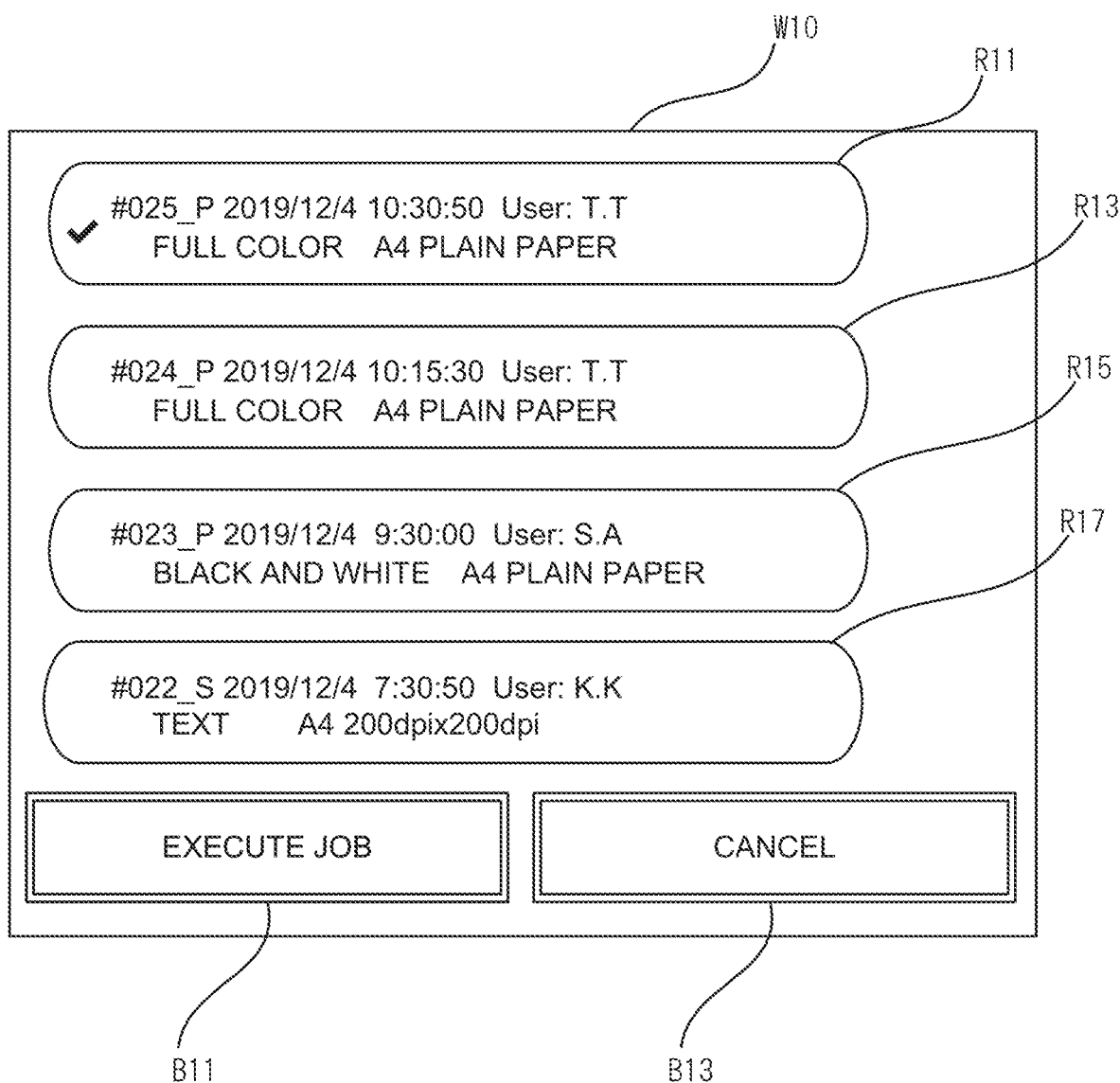
FIG. 8 is a diagram illustrating an operation example of the multifunction machine according to the first embodiment.

A display screen W10 illustrated in FIG. 8 is a configuration example of a setting history information selection screen. The display screen W10 includes setting history information display areas R11 to R17, a job execution button B11, and a cancel button B13. The setting history information display areas R11 to R17 are configured by arranging in parallel pieces of setting history information in chronological order starting with a newest one in the order of job execution, or in the order of processing results by the controller 11. The example illustrated in FIG. 8 is an example in which four rows of setting history information are arranged in parallel. Note that, the number of pieces of setting history information arranged in parallel is not limited to four, and can be set appropriately according to a displayable area of the displayer 13.

Information to be displayed in the setting history information display areas R11 to R17 is information read from setting history information stored in the setting history information storage area 239 by the controller 11. The configuration example illustrated by the setting history information display areas R11 to R17 includes a job ID, a job execution date and time, a name of an executing user, and a setting value.

The setting history information display area R11 is described as an example. Job ID is associated with an executed job, and is an identifier for uniquely identifying setting history information. One of alphabetic characters representing each job function (print function: P, fax function: F, scan function: S) is attached to a job ID according to the present embodiment in such a way that the user can identify a job function at a glance. For example, the job ID "#025_P" is the 25th executed job, and indicates a job pertaining to a print function. The job execution date and time (2019 Dec. 4 10:30:50) indicates the date and time of job execution. The name of the executing user (User: T.T.) is the name of the user who executed the job.

Setting values are at least a part of setting values included in setting history information. Setting value items displayed in the setting history information display area can be set and changed appropriately according to the user's level of attention.

The display example of the setting history information display area R11 is an example in which, as a display example of setting values, a setting value item: a setting value of color mode is "full color", a setting value item: a setting value of paper size is "A4", and a setting value item: a setting value of paper type is "plain paper" are displayed.

The job ID "#024_P" in the setting history information display area R13 is the 24th executed job, and indicates a print job pertaining to a print function; the job ID "#023_P" in the setting history information display area R15 is the 23rd executed job, and indicates a print job pertaining to a print function; and the job ID "#022_S" in the setting history information display area R17 is the 22nd executed job, and indicates a scan job pertaining to a scan function.

The display screen W10 illustrated in FIG. 8 is an example in which setting history information pertaining to the 25th print job at 10:30:50 on Dec. 4, 2019, the 24th print job at 10:1.5:30 on Dec. 4, 2019, the 23rd print job at 9:30:00 on Dec. 4, 2019, and the 22nd scan job at 7:30:50 on Dec. 4, 2019 are displayed in parallel in chronological order.

The job execution button B11 is a button that accepts an execution instruction input of a job pertaining to setting history information selected by a user. The user, for example, executes a job pertaining to selected setting history information by adding a check as illustrated in the setting history information display area R11, and pressing the job execution button B11. Upon receiving pressing of the job execution button B11, the controller 11 can execute a desired job by performing processing such as step S40 in FIG. 6.

The cancel button B13 is a button that accepts input cancellation by the user.

Next, a setting screen W20 to be displayed by the controller 11 in response to pressing of the job execution button B11 is described. The setting screen W20 is a configuration example of a setting screen for displaying a setting value included in setting history information to the user, and accepting input, change, or the like of a setting value.

The setting screen W20 includes job function-specific tabs T11 to T15, a setting value input/change area R19, a setting history information display area R21, a comparison setting value setting button B15, an OK button B17, and a cancel button B19.

Figure 9:
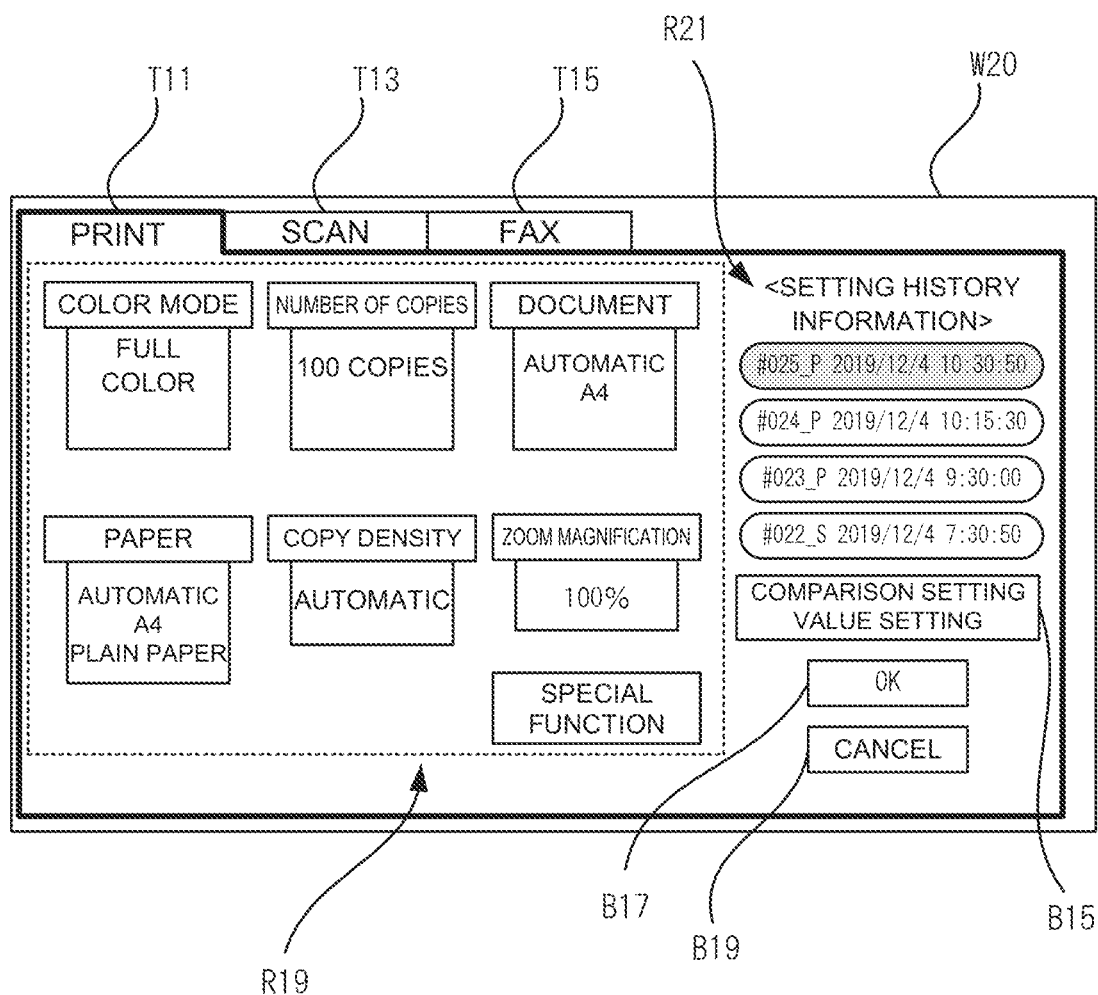
FIG. 9 is a diagram illustrating an operation example of the multifunction machine according to the first embodiment.

The job function-specific tabs T11 to T15 are tabs that accept switching between setting screens provided for each job function. The setting screen W20 includes a print tab T11, a scan tab T13, and a fax tab T15. The configuration example in FIG. 9 illustrates a scene in which the print tab T11 is selected.

The setting value input/change area R19 is an area that accepts input/change of a setting value pertaining to job execution. When desired setting history information is selected by the user via the display screen W10 in FIG. 8, and the job execution button B11 is pressed, the controller 11 reflects and displays a content of a setting value pertaining to the selected setting history information in the setting value input/change area R19.

By allowing the user to check a setting value of setting history information displayed in the setting value input/change area R19, the user can recognize a setting value pertaining to job execution. For example, FIG. 9 illustrates a scene in which setting history information pertaining to the job ID "#025_P" is selected, and a setting value content of the setting history information is displayed. Specifically, the example is an example in which a setting value item: a setting value of color mode is "full color", a setting value item: a setting value of the number of copies is "100 copies", a setting value item: a setting value of paper (document) size is "A4 (automatic)", a setting value item: a setting value of paper type is "plain paper (automatic, A4)", a setting value item: a setting value of copy density is "automatic", and a setting value item: a setting value of zoom magnification is "100%" are displayed as setting values.

Note that, other setting values (e.g., double-sided printing, N-Up printing, fit page, finishing function, and the like) can be displayed by pressing a "special function" button within the setting value input/change area R19.

The setting history information display area 121 is an area in which setting history information displayed on the display screen W10 in FIG. 8 is reflected and displayed. Herein, the area is displayed in a dark mode in such a way as to easily understand that setting history information pertaining to the job ID "#025_P" is selected by the user.

The comparison setting value setting button B15 accepts a determination/change input of a setting value pertaining to setting value comparison determination. Upon receiving pressing of the comparison setting value setting button B15, the controller 11 displays a comparison setting value setting screen W30 illustrated in FIGS. 10A to 10C.

The OK button B17 is a button that accepts input approval by the user. The cancel button B19 is a button that accepts input cancellation by the user.

Figure 10A:
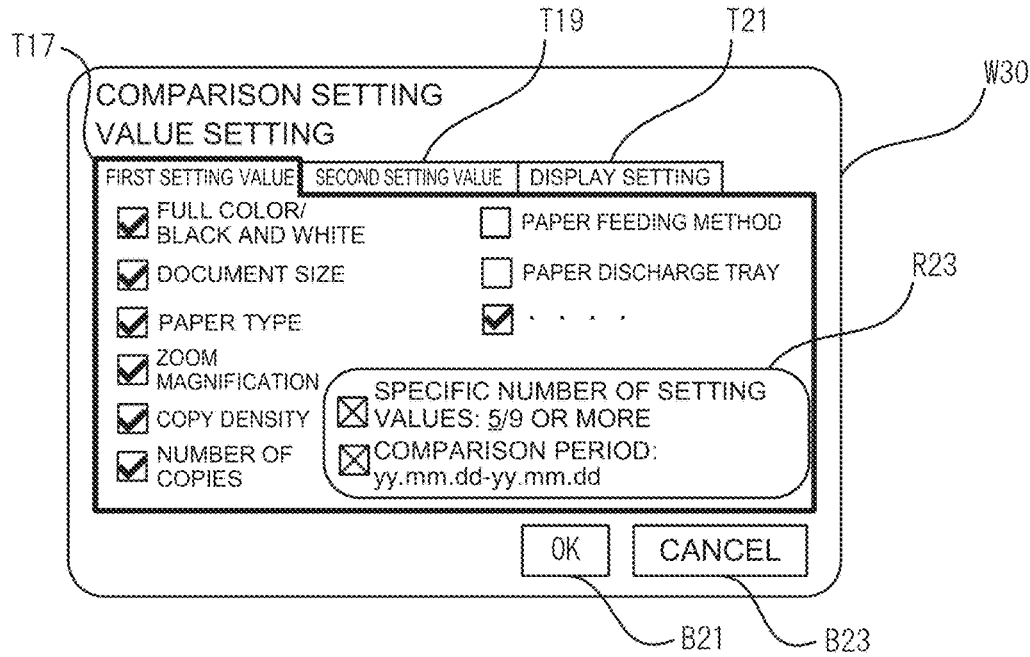
FIGS. 10A to 10C are diagrams illustrating an operation example of the multifunction machine according to the first embodiment.
Figure 10B:
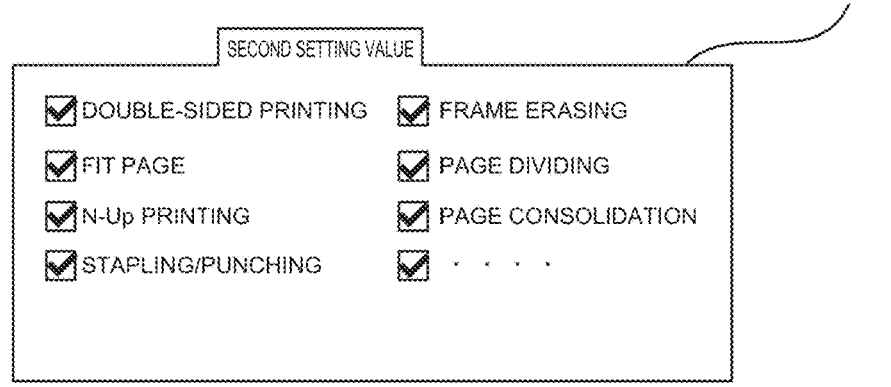
Figure 10C:
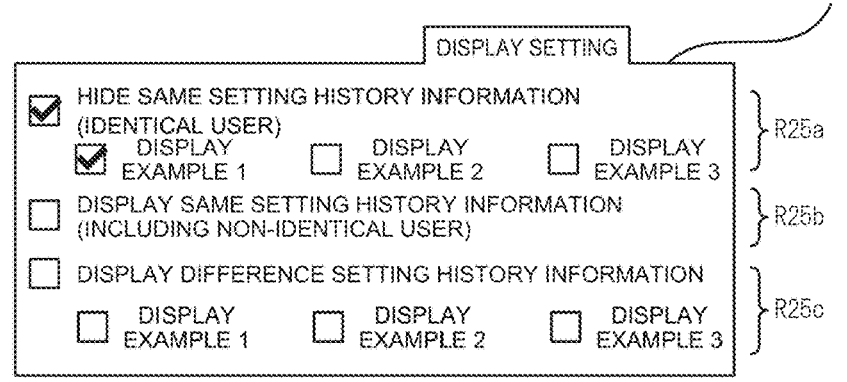

Next, the comparison setting value setting screen W30 to be displayed by the controller 11 in response to pressing of the comparison setting value setting button B15 is described using FIGS. 10A to 10C.

The comparison setting value setting screen W30 according to the first embodiment is a screen that accepts selection, determination, and the like of a setting value for use in comparison between a setting value pertaining to a newly executed job and a setting value pertaining to setting history information of an already executed job.

The comparison setting value setting screen W30 includes a first setting value input tab T17, a second setting value input tab T19, a display setting tab T21, a specific setting value number display area R23, an OK button 121, and a cancel button B23.

FIG. 10A is a configuration example of the first setting value input tab T17. The first setting value input tab T17 includes a setting value whose frequency of change by the user is supposed to be high. Therefore, it is preferable to configure the first setting value input tab T17 with use of a selection operation by the user as a basic operation in such a way that, for example, a setting value that is determined not to be needed to be recognized by the user is not selected. In addition, in order to promote a selection operation by the user, it is preferable to configure the first setting value input tab T17, as a first display screen to be noticed by the user first, when a screen display instruction for the comparison setting value setting screen W30 is input.

FIG. 10B is a configuration example of the second setting value input tab T19. The second setting value input tab T19 includes a setting value whose frequency of change is not so high, but which is supposed that a desired job execution result cannot be acquired unless the user recognizes a fact that the setting value has been changed. Because of a low frequency of change by the user, the second setting value input tab T19 can also be displayed in a state (initial setting values) in which all the setting values to be displayed are selected in advance, as illustrated in FIG. 10B, for example. In this case, regarding a setting value that is determined not to be needed to be recognized by the user, the user may release the selection by unchecking the box. For this reason, it is preferable to configure the second setting value input tab T19 as a second display screen having a lower display priority than the first setting value input tab T17.

FIG. 10C is a configuration example of the display setting tab T21. The display setting tab T21 accepts a display format of setting history information after display processing by the controller 11 (see step S140 in FIG. 6). The display setting tab T21 according to the first embodiment includes a check box R25$a$ indicating hiding same setting history information (identical user), a check box R25$b$ indicating displaying same setting history information (including non-identical user), and a check box R25$c$ indicating displaying difference setting history information.

The check box R25$a$ indicating hiding same setting history information (identical user) is a check box that accepts a display format of setting history information compiled and processed by the controller 11, when setting values accepted via the first setting value input tab T17 and the second setting value input tab T19 are the same between setting history information, and a user pertaining to a job under execution and a user pertaining to an already executed job are the same. Note that, the display example 1 check box, the display example 2 check box, and the display example 3 check box are check boxes that accept designation of a specific display example of setting history information.

The check box R25$b$ indicating displaying same setting history information (including non-identical user) is a check box that accepts a display format of setting history information to be displayed by the controller 11, when setting values accepted via the first setting value input tab T17 and the second setting value input tab T19 are the same between setting history information, and a user pertaining to a job under execution and a user pertaining to an already executed job are different.

The check box R25$c$ indicating displaying difference setting history information is a check box that accepts a display format of setting history information to be displayed by the controller 11, when setting values accepted via the first setting value input tab T17 and the second setting value input tab T19 are different between setting history information. Note that, the display example 1 check box, the display example 2 check box, and the display example 3 check box are check boxes that accept designation of a specific display example of difference setting history information.

The specific setting value number display area R23 includes a specific setting value number designation area, and a comparison period designation area. The specific setting value number designation area is an area that accepts an input of an allowable number of setting values in which first setting values are regarded to be the same, even when the first setting values are different between a setting value pertaining to a newly executed job and a setting value in setting history information pertaining to an already executed job in setting value comparison determination processing. The example illustrated in FIG. 10A is an example in which first setting values are set to be the same, as far as five or more of the nine first setting values are the same.

The comparison period designation area is an area that accepts an input of a determination period during which it is determined whether an already executed job to be compared is executed within a predetermined period of time after execution of a new job.

The OK button B21 is a button that accepts input approval by the user. The cancel button B23 is a button that accepts input cancellation by the user.

Figure 11A:
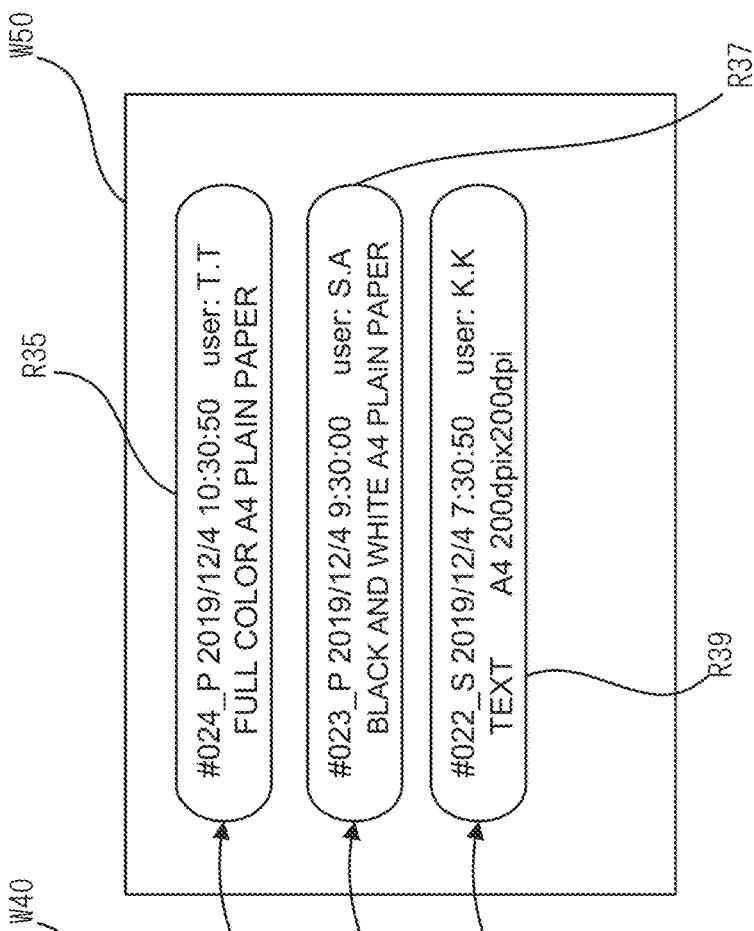
FIGS. 11A to 11B are diagrams illustrating an operation example of the multifunction machine according to the first embodiment.
Figure 11B:
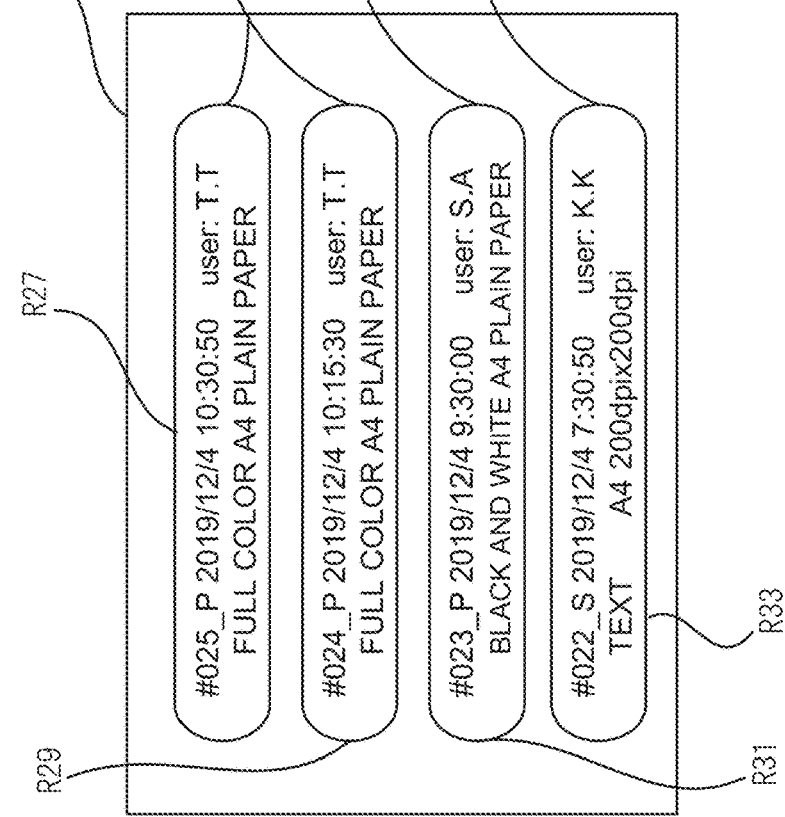

FIGS. 11A to 11B are a configuration example of a display result, when a check is added to the check box R25a indicating hiding same setting history information (identical user) in FIGS. 10A to 10C, and the display example 1 check box associated therewith. Note that, the present operation is an example of processing of step S120 to step S140 in FIG. 6.

Herein, a display screen W40 in FIG. 11A is the same as illustrated in the display screen W10 in FIG. 8, and is a display example when no processing is performed by the controller 11. A display screen W50 in FIG. 11B is a display example of setting history information after compiling processing of same setting history information is performed by the controller 11.

When comparison determination processing according to the first embodiment is not performed, as illustrated in FIG. 11A, setting history information pertaining to job execution is generated as setting history information pertaining to the job ID "#025_P". Then, setting history information in which the setting history information pertaining to the job ID "#025_P" is the latest setting history information is arranged in chronological order (setting history information display areas R27 to R33).

On the other hand, when comparison determination processing according to the present embodiment is performed, the controller 11 performs comparison determination between a setting value of the job ID "#025_P" as a newly executed job and a setting value included in setting history information of the job ID "#024_P" as an already executed job.

The setting value pertaining to the job ID "#025_P" and the setting value pertaining to the job ID "#024_P" are substantially the same. Further, the executing user is also identical with the user name: T.T. Therefore, the controller 11 determines that the setting value of the job ID "#025_P" and the setting value included in the setting history information of the job ID "#024_P" are the same. In this case, the controller 11 does not generate setting history information pertaining to the job ID "#025_P".

Then, the controller 11 performs compiling processing in which the execution date and time of the job ID "#024_P" is updated and stored as the execution date and time pertaining to the job ID "#025_P" (setting history information display area R35).

On the other hand, setting history information pertaining to the job ID "#023_P" displayed in the setting history information display area R31, and setting history information pertaining to the job ID "#022_S" displayed in the setting history information display area R33 are displayed as the setting history information display area R37 and the setting history information display area R39 as themselves, as illustrated in FIG. 11B.

Figure 12A:
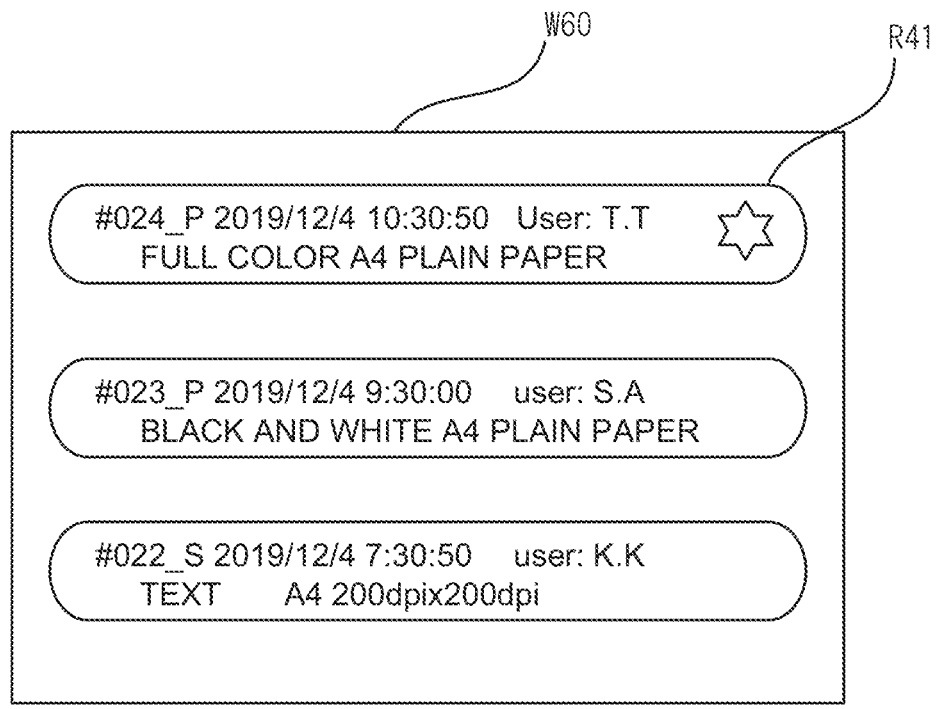
FIGS. 12A and 12B are diagrams illustrating an operation example of the multifunction machine according to the first embodiment.
Figure 12B:
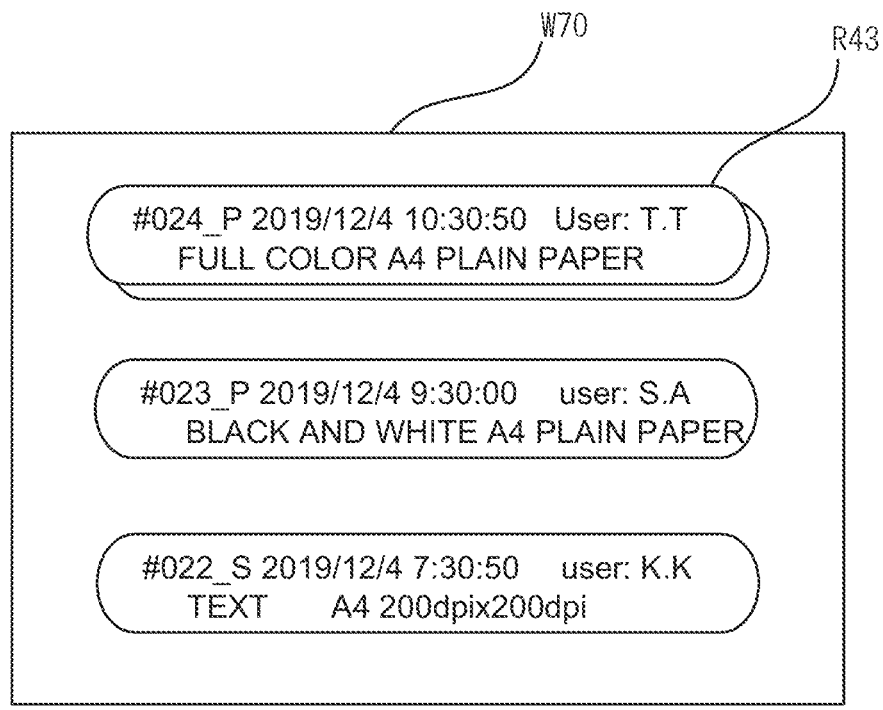

Note that, as a display example of compiling processing, it is also possible to display as an example illustrated in FIGS. 12A and 12B, for example, separately of the example in FIGS. 11A to 11B.

FIG. 12A is a configuration example of a display screen W60, when a check is added to the check box R25a indicating hiding same setting history information (identical user), and the display example 2 check box associated therewith in FIG. 10C.

FIG. 12A is an example in which a hexagram mark is added to a setting history information display area R41 pertaining to the job ID "#024_P", as setting history information to which compiling processing is applied.

FIG. 12B is a configuration example of a display screen W70, when a check is added to the check box R25a indicating hiding same setting history information (identical user), and the display example 3 check box associated therewith in FIG. 10C.

FIG. 12B is an example in which a figure imitating a display area suggesting presence of other setting history information is attached to a setting history information display area R43 pertaining to the job ID "#024_P", as setting history information to which compiling processing is applied. As illustrated in FIGS. 12A and 12B, by processing a display configuration in such a way that the user can recognize at a glance a fact that compiling processing of setting history information has been performed, the user can easily recognize the fact.

Figure 13A:
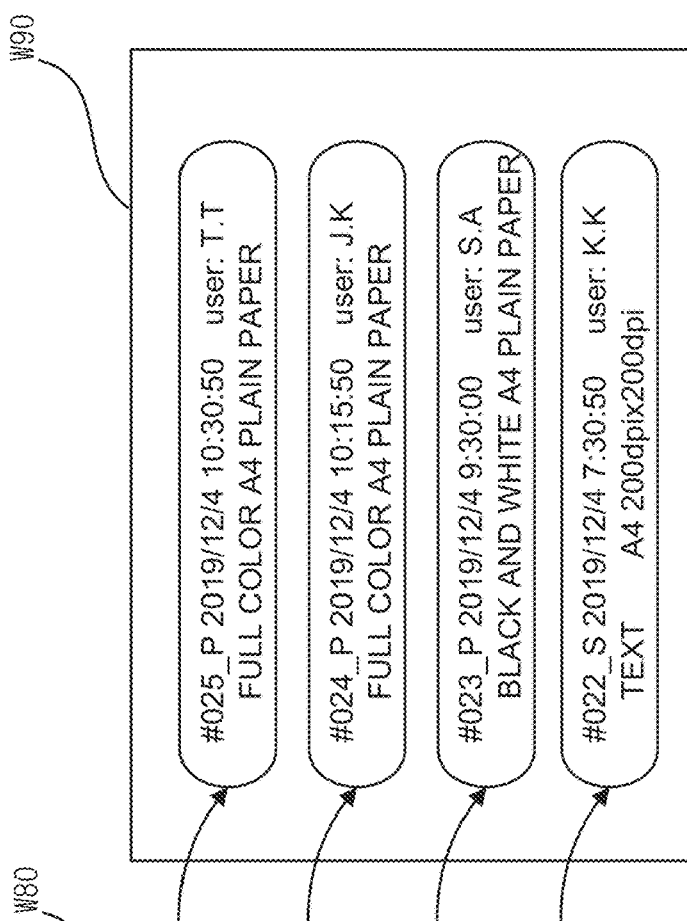
FIGS. 13A to 13B are diagrams illustrating an operation example of the multifunction machine according to the first embodiment.
Figure 13B:
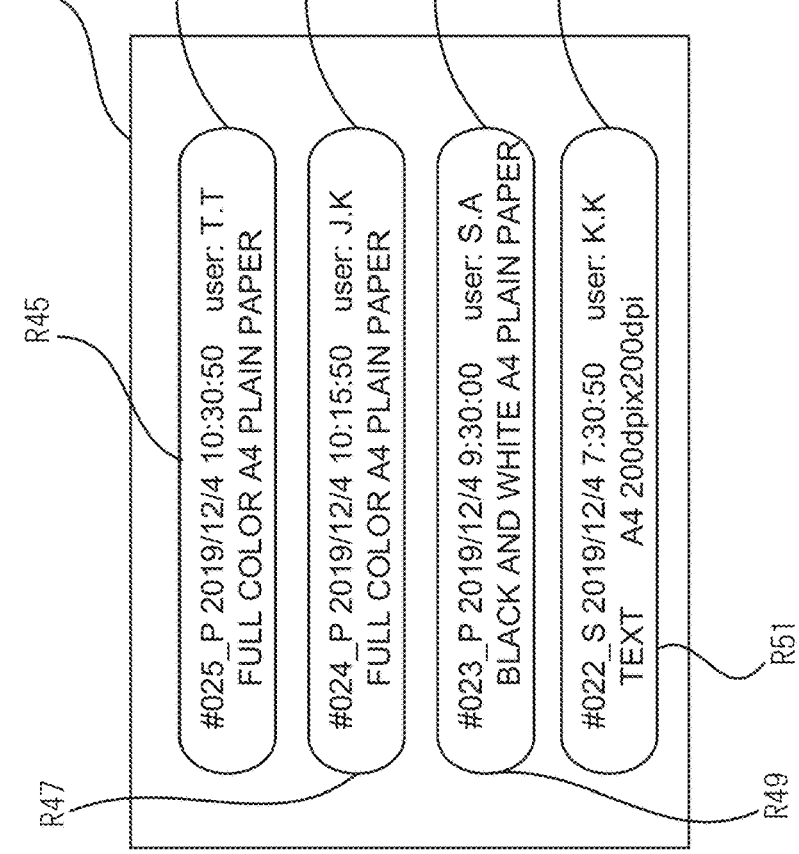

On the other hand, FIG. 13B is an example of a display screen W90, when a check is added to the check box R25b indicating displaying same setting history information (including non-identical user) in FIG. 10C.

Herein, an example of a display screen W80 illustrated in FIG. 13A is partially different from the example illustrated in the display screen W10 in FIG. 7. The already executed job (job ID "#024_P") is a job executed by an executing user having the initial J.K., but the newly executed job (job ID "#025_P") is a job executed by an executing user having the initial T.T.

When a check is added to the check box R25b indicating displaying same setting history information (including non-identical user) in FIG. 10C, even when a setting value pertaining to a newly executed job and a setting value pertaining to an already executed job are the same, the controller 11 does not perform compiling processing of setting history information, as far as executing users do not match.

The controller 11 displays, as the display screen W90 illustrated in FIG. 13B, setting history information identical (no processing is changed) to setting history information display areas R45 to R51 illustrated in the display screen W80 in FIG. 13A in chronological order of job execution starting with a newest one.

Figure 14A:
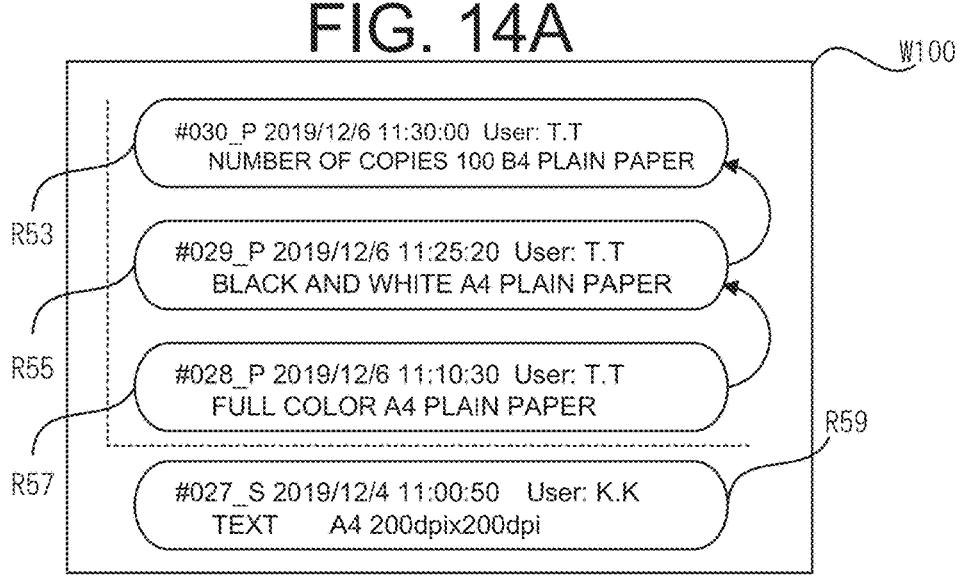
FIGS. 14A to 14C are diagrams illustrating an operation example of the multifunction machine according to the first embodiment.

Next, a display screen W100 in FIG. 14A is a configuration example of a difference display result of setting history information to be displayed by the controller 11, when a check is added to the check box R25c indicating displaying difference setting history information and the display example 1 check box associated therewith in FIG. 10C. A display screen W110 in FIG. 14B is an example when a check is added to the display example 2 check box, and a display screen W120 in FIG. 14C is an example when a check is added to the display example 3 check box.

Figure 14B:
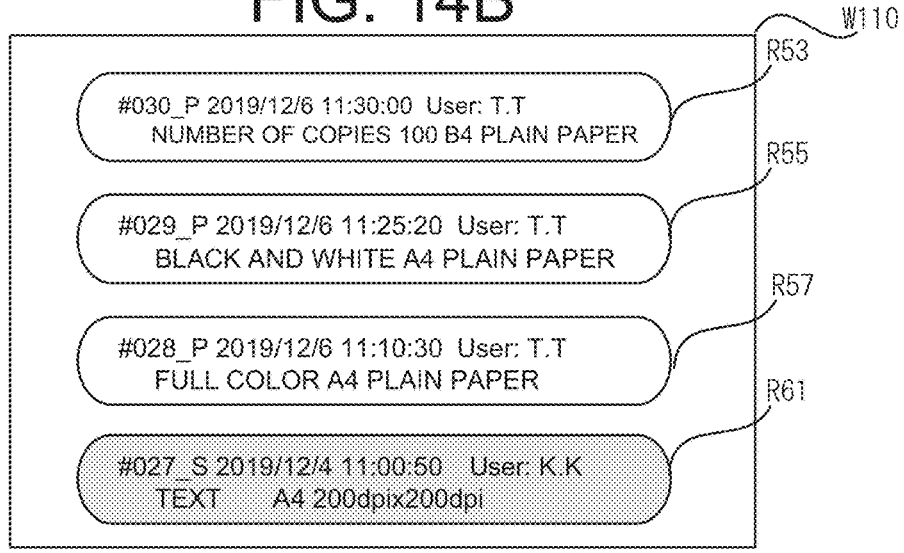
Figure 14C:
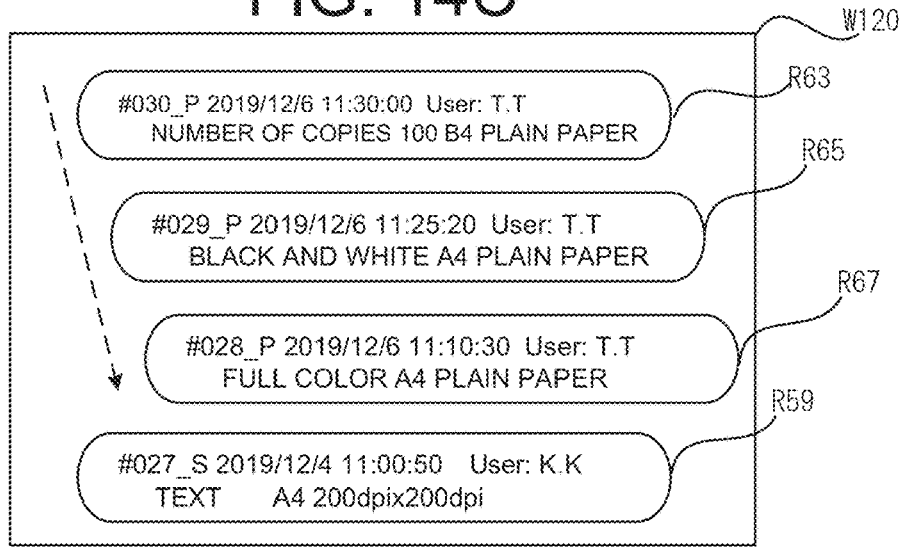

Note that, FIGS. 14A to 14C illustrate an example, in which a job pertaining to the ID "#028_P" is first executed by an executing user having the initial T.T., then, the job ID "#029_P" is executed by an executing user having the initial T.T., and finally, the job ID "#030_P" is executed by an executing user having the initial T.T., as well.

In addition, description is made based on a premise that the executing user having the initial T.T. executes the job ID "#029_P" by partially changing setting history information pertaining to the job ID "#028_P", and also executes the job pertaining to the job ID "#030_P" by partially changing setting history information of the job ID "#029_P".

First, the executing user having the initial T.T. executes, based on setting history information displayed in a setting history information display area R57, a print job pertaining to the job ID "#028_P" with a setting value item: color mode is "full color", a setting value item: paper size is "A4", and a setting value item: paper type is "plain paper".

Next, the executing user having the initial T.T. refers to setting history information displayed in the setting history information display area R57, changes to the setting value item: a setting value of color ode is "black and white", and executes a print job pertaining to the job ID "#029_P" with a setting value item: paper size is "A4" and a setting value item: paper type is "plain paper".

Finally, the executing user having the initial T.T. refers to setting history information displayed in a setting history information display area R55, changes to a setting value item: color mode is "black and white" and to a setting value item: a setting value of paper size is "B4", and executes a print job with a setting value item: paper type is "plain paper" and a setting value item: number of copies is 100 copies (setting history information display area R53).

In a case where the apparatus has such a job execution history, the controller 11 displays a difference part of setting history information in such a way that a difference (change part) in setting values at each job execution stage becomes clear.

In this case, for example, in order to make it easy to recognize a difference in setting history information, it is possible to separate a setting history information display area R59 that displays setting history information (job ID "#027_S") immediately before a difference occurs, and a setting history information display area R57 that displays setting history information (job ID "#028_P") in which the difference occurs by a solid line or a dotted line (FIG. 14A), or to make a display color of a setting history information display area R61 that displays setting history information (job ID "#027_S", immediately before a difference occurs to a different color (FIG. 14B).

Further, as illustrated in FIG. 14C, in order to make it easy to recognize a change history of setting history information, setting history information pertaining to changes (setting history information display areas R63 to R67) may be arranged in parallel in a hierarchical manner, for example, to remind that updating (changing) of a setting history has been performed in chronological order.

As described above, in the first embodiment, a display format of setting history information pertaining to a new job is determined by a determination result as to whether, when a new job is executed based on setting history information pertaining to an already executed job selected via a setting history information selection screen, a setting value pertaining to execution of the job and a setting value pertaining to setting history information of the already executed job are the same. Therefore, the user can use setting history information pertaining to a desired job without fail.

2. Second Embodiment

Next, a second embodiment is described. Unlike the first embodiment, the second embodiment is an embodiment when a job is executed by using a registered job program, instead of selecting setting history information via a setting history information selection screen. In description of the second embodiment, a same functional unit and processing as those in the first embodiment are designated with a same reference sign, and description thereof is omitted.

2.1 Functional Configuration

Figure 15:
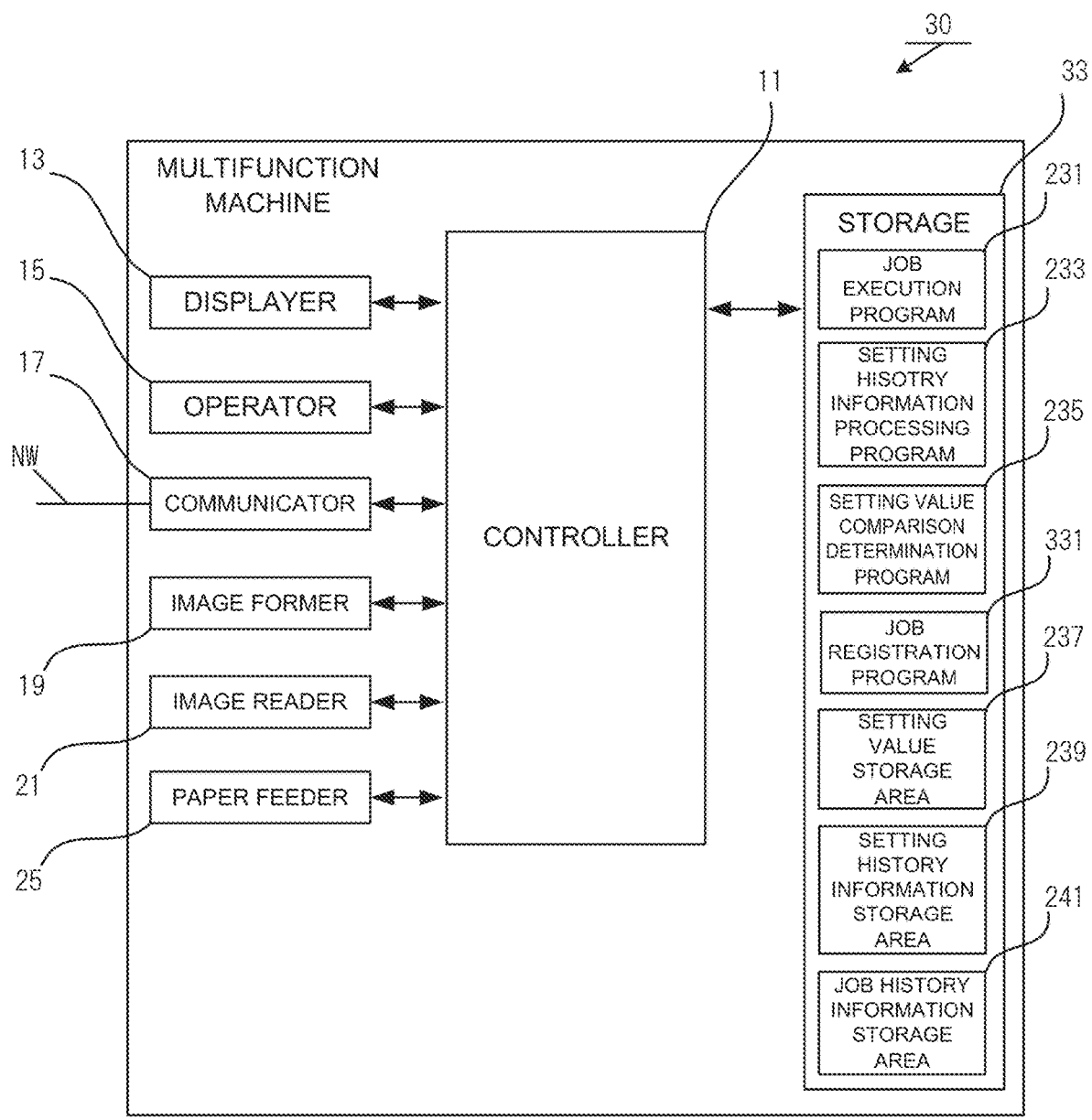
FIG. 15 is a functional configuration diagram of a multifunction machine according to a second embodiment.

FIG. 15 is a diagram illustrating a functional configuration of a multifunction machine 30 according to the second embodiment. The multifunction machine 30 according to the second embodiment is provided with a storage 33 instead of the storage 23 of the multifunction machine 10.

In the second embodiment, the storage 33 stores a job execution program 231, a setting history information processing program 233, a setting value comparison determination program 235, and a job registration program 331, and secures a setting value storage area 237, a setting history information storage area 239, and a job history information storage area 241.

The job registration program 331 is a program to be read by a controller 11, when a series of processing pertaining to a job are registered as a job program, or when a registered job program is called and erased. Note that, in the present disclosure, a configuration in which a series of processing pertaining to a job are registered as a program is referred to as a job program.

2.2 Flow of Processing

Figure 16:
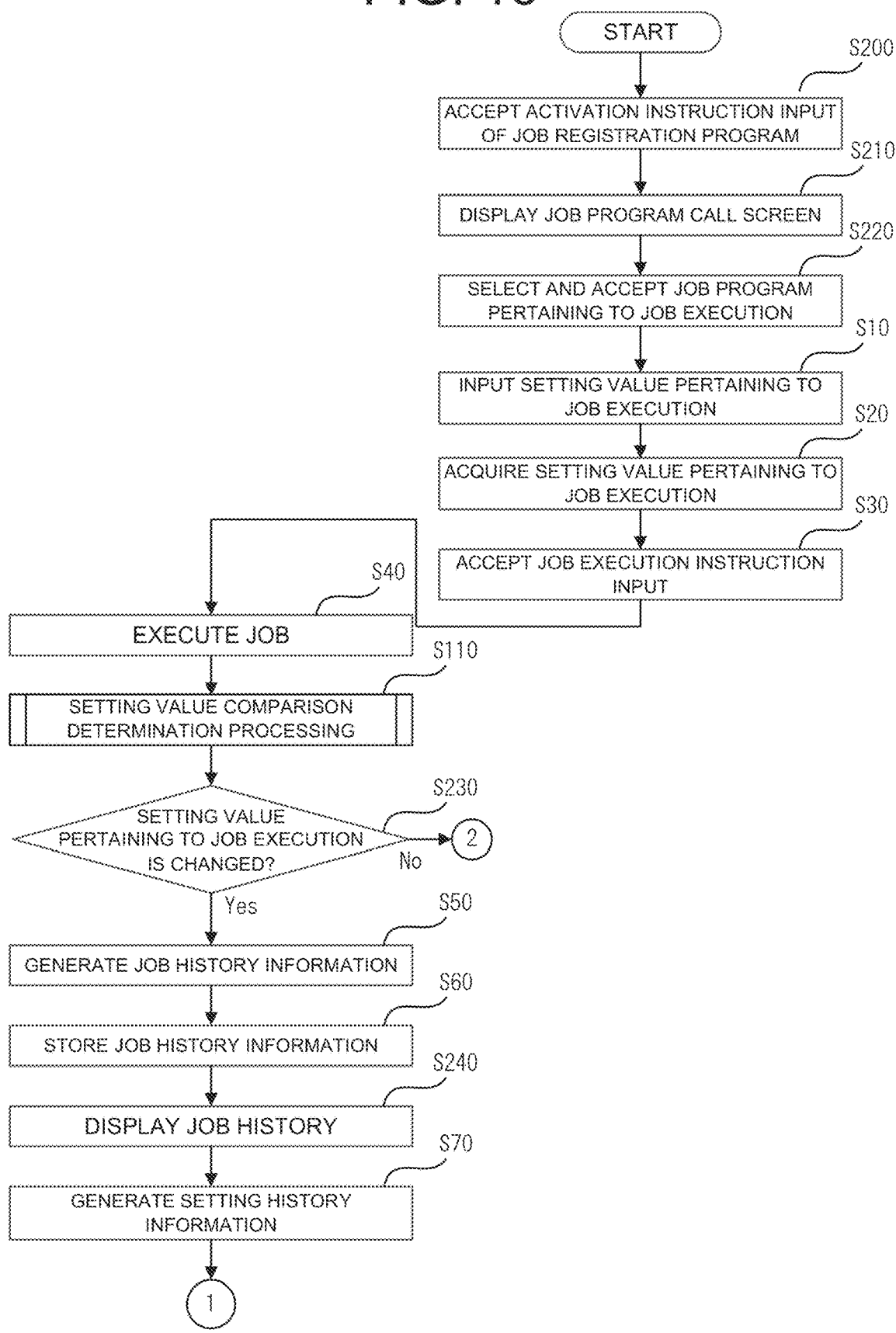
FIG. 16 is a flowchart illustrating a flow of processing of the multifunction machine according to the second embodiment.
Figure 17:
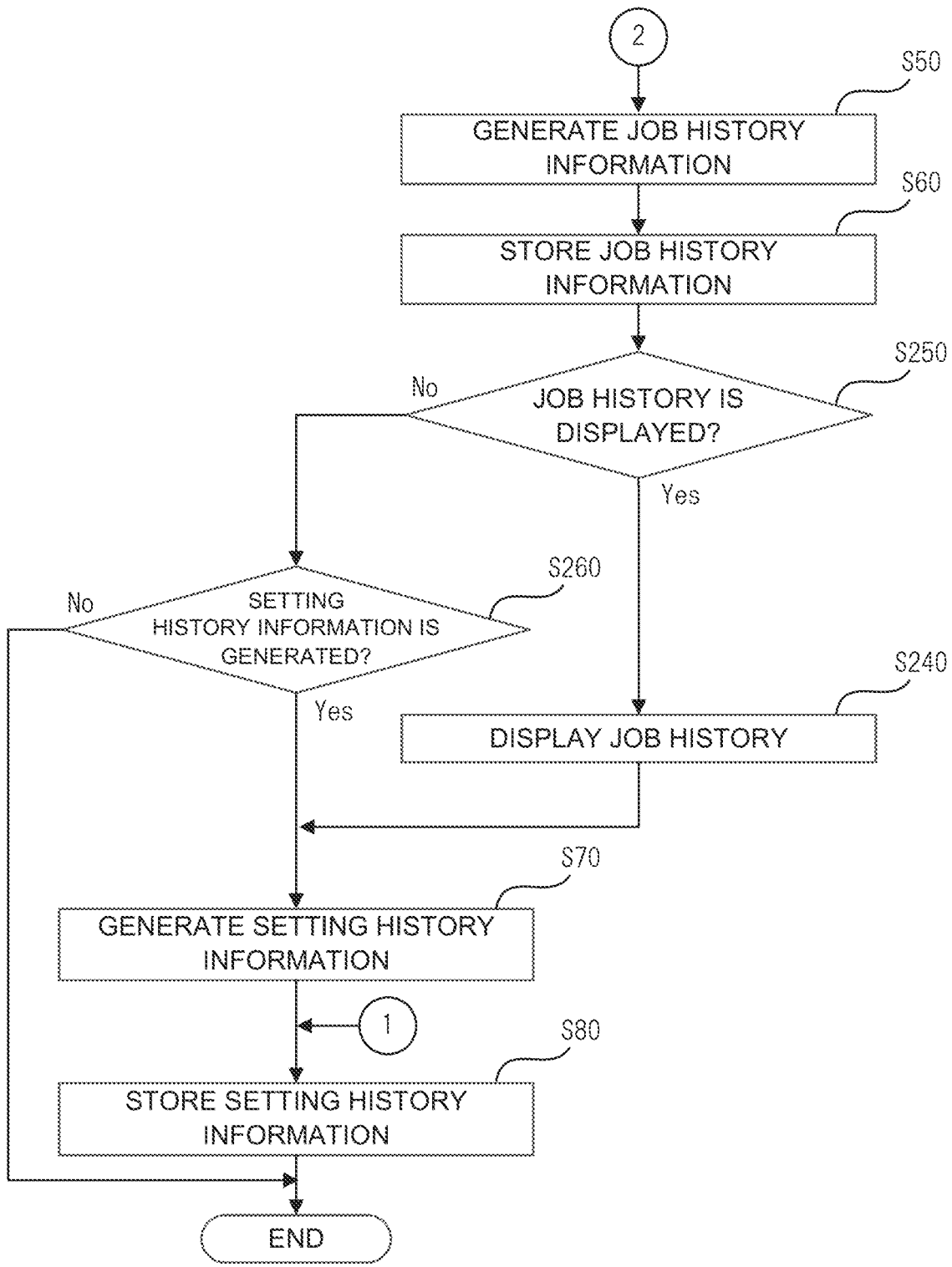
FIG. 17 is a flowchart illustrating a flow of processing of the multifunction machine according to the second embodiment.

Next, a flow of processing according to the second embodiment is described using FIGS. 16 and 17.

Note that, the controller 11 performs the present processing by reading the job execution program 231, the setting history information processing program 233, the setting value comparison determination program 235, and the job registration program 331. Note that, in the present processing, same processing as that described in the first embodiment is designated with a same step number.

First, in step S200, the controller 11 accepts a startup instruction input of the job registration program 331 via a displayer 13 or an operator 15.

Next, in step S210, the controller 11 reads the job registration program 331, and displays a job program call screen on the displayer 13.

In step S220, the controller 11 accepts selection of a job program by the user. Then, the controller 11 displays a setting screen for displaying, to the user, a setting value pertaining to setting history information held by the selected job program.

When a setting value pertaining to execution of a job such as a print job, a fax job, or a scan job is input or changed by the user via the setting screen, the controller 11 acquires a setting value pertaining to the job execution (step S10→step S20). The controller 11 stores the acquired setting value in the setting value storage area 237.

In step S30, the controller 11 accepts a job execution instruction input by receiving pressing of an unillustrated start button or the like on the operator 15, the displayer 13, or the like.

In step S40, the controller 11 performs a print job, a fax job, a scan job, or the like, based on the setting value acquired in step S20.

Next, in step S110, the controller 11 performs setting value comparison determination processing. Note that, in the present step, same user determination processing described in step S130 in FIG. 6 may be further added.

When the setting value pertaining to job execution is changed as a result of setting value comparison determination processing (step S230; Yes), the controller 11 generates job history information regarding a newly executed job (step S50), and stores the job history information in the job history information storage area 241 (step S60).

Next, the controller 11 generates a job history, based on the job history information stored in the job history information storage area 241. The controller 11 displays the generated job history on the displayer 13 (step S240). In this case, the controller 11 displays, as an item to be displayed in a job history, a difference in setting values (changed setting value). For example, when only the number of copies to be printed is changed in a job program pertaining to a print job, the controller 11 displays the job program name and the number of copies to be printed. By displaying, as a job history, the job program name and the difference in setting values, the user can easily recognize the executed job program and the changed setting value.

Next, in step S70, the controller 11 reads, from the setting value storage area 237, a setting value pertaining to the executed job. The controller 11 generates setting history information by attaching, to information constituted of combination of the read setting value, and history information pertaining to job execution such as a job function, a name of an executing user, and an execution date and time, an ID for uniquely identifying the information. Next, in step S80, the controller 11 stores the generated setting history information in the setting history information storage area 239.

On the other hand, when the setting value pertaining to job execution is not changed as a result of setting value comparison determination processing (step S230; No), the controller 11 generates job history information pertaining to the executed job (step S50). Then, in step S60, the controller 11 stores the generated job history information in the job history information storage area 241.

Next, the controller 11 determines whether the job history is to be displayed on the displayer 13 (step S250). Note that, the controller 11 determines whether the job history is to be displayed based on a setting content set in advance by the user.

When it is determined that the job history is to be displayed (step S250; Yes), the controller 11 generates a job history, based on the job history information stored in the job history information storage area 241. The controller 11 displays the generated job history on the displayer 13 (step S240). In this case, the controller 11 displays, as items to be displayed in the job history, a job program name and a name of an executing user. By displaying, as a job history, a job program name and a name of an executing user, a user browsing the job history can easily recognize the executed job program and the executing user who executed the job program.

On the other hand, when it is determined that the job history is not displayed (step S250; No), the controller 11 determines whether to generate setting history information (step S260). Note that, the controller 11 determines whether to generate setting history information, based on a setting content set in advance by the user.

When it is determined that setting history information is to be generated (step S260; Yes), the controller 11 generates the setting history information in step S70. Then, the controller 11 stores the generated setting history information in the setting history information storage area 239 (step S80), and ends the processing (step S80).

Note that, even when it is temporarily determined that a job history is not to be displayed (step S250; No), when it is determined that setting history information is to be generated (step S260; Yes), the controller 11 can display the job history in response to a request from the user.

On the other hand, when it is determined that setting history information is not generated (step S260; No), the controller 11 ends the processing.

2.3 Operation Example

Figure 18A:
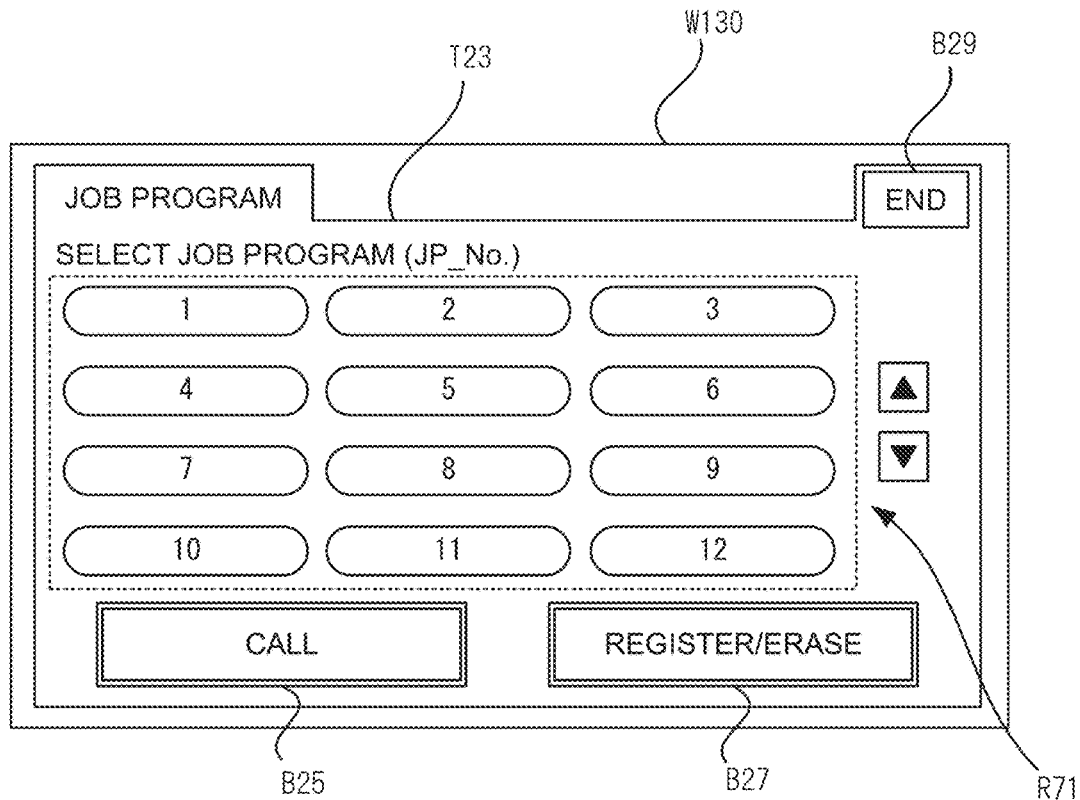
FIGS. 18A and 18B are diagrams illustrating an operation example of the multifunction machine according to the second embodiment.

Next, an operation example according to the second embodiment is described. FIG. 18A is a configuration example of a job program call screen W130 to be displayed by causing the controller 11 to read the job registration program 331.

The job program call screen W130 includes a job program call tab T23. The job program call tab T23 includes a job program selection area R71, a call button B25, a register/erase button B27, and an end button B29.

The job program selection area R71 accepts, for example, registration or erasing of a created job program, and selection of a job program to be executed by the user by pressing a display button to which each job program number (JP_Nos. 1 to 12) is allocated.

The call button B25 is a button that accepts a call instruction input of a job program by the user. Upon receiving pressing of the button by the user, the controller 11 calls a job program associated with a job program number accepted via the job program selection area R71.

Figure 18B:
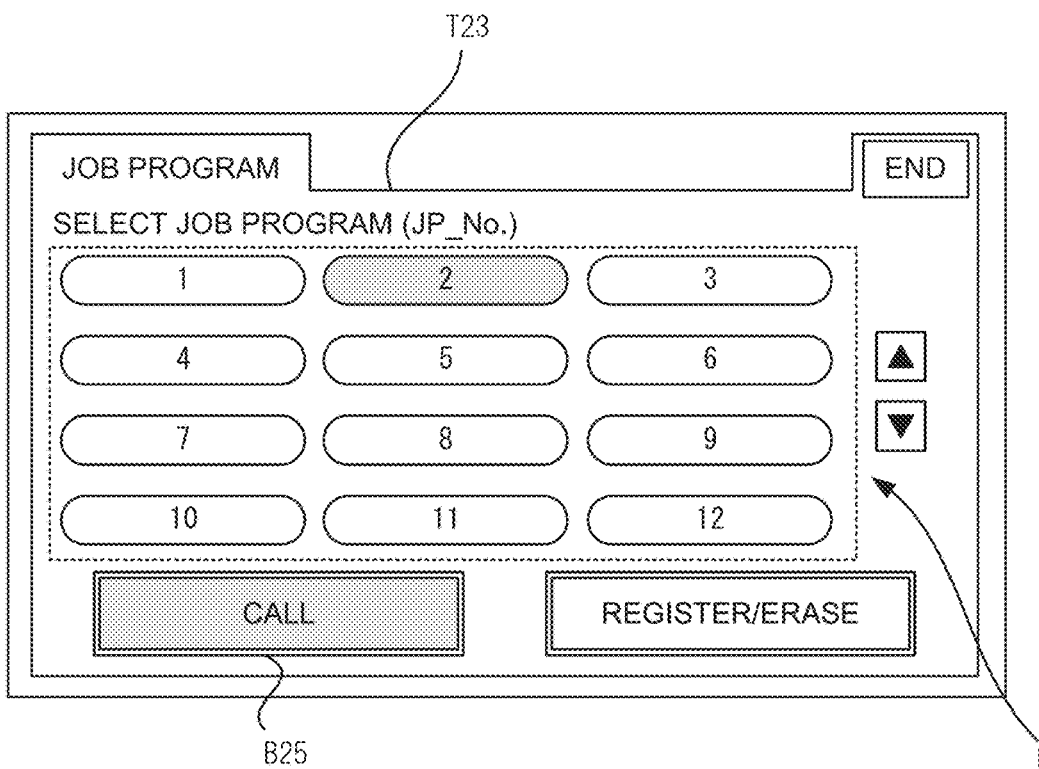

As illustrated in FIG. 18B, the user selects a job program number associated with a job program to be called (FIG. 18B illustrates a scene in which the job program number 2 (JP_No. 2) is selected). Then, the user can call a desired job program by pressing the call button B25.

The register/erase button B27 is a button that accepts registration or erasing of a job program called by the controller 11.

The end button B29 is a button that accepts pressing by the user when the job program call screen W130 is closed. When the end button B29 is pressed, the controller 11 ends the processing by the job registration program 331.

Figure 19:
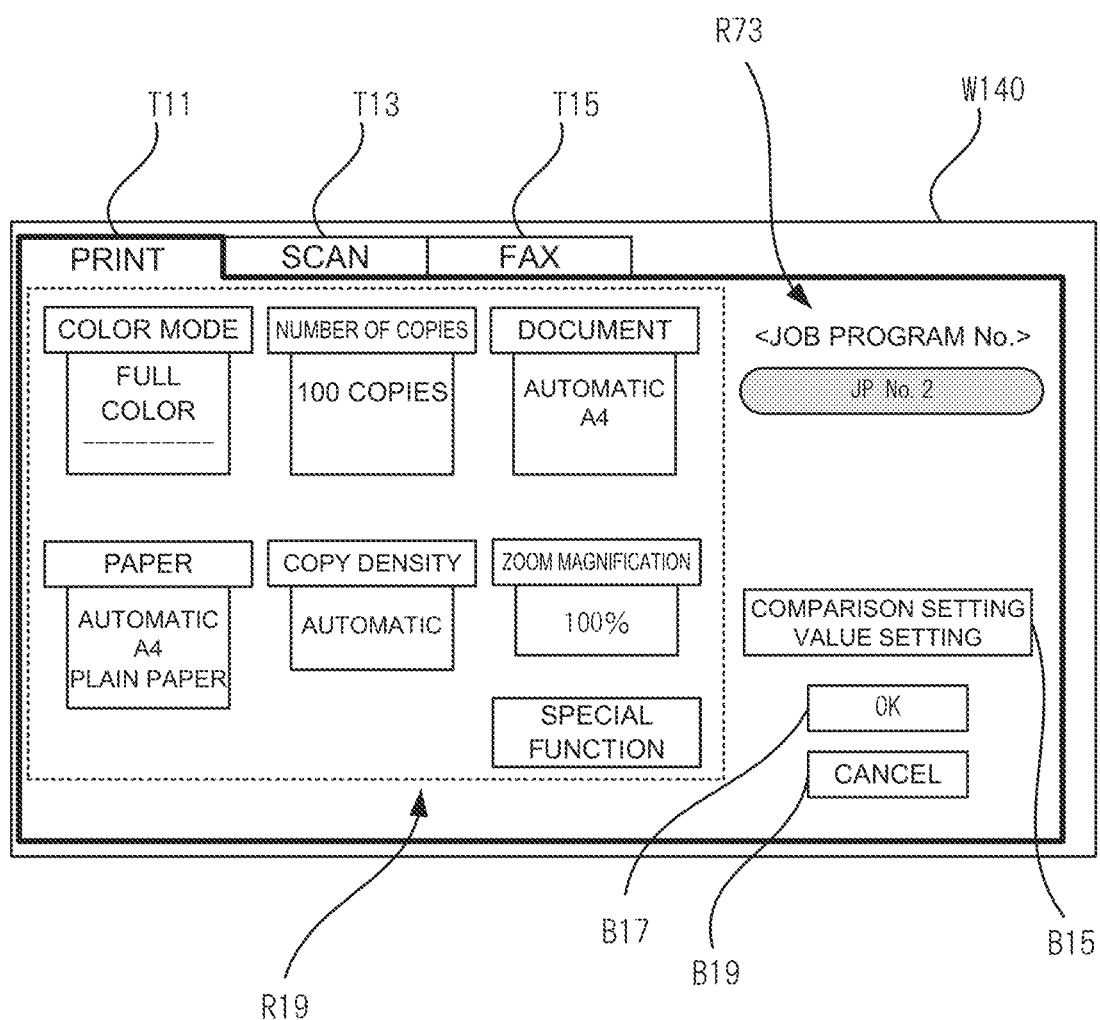
FIG. 19 is a diagram illustrating an operation example of the multifunction machine according to the second embodiment.

FIG. 19 is a configuration example of a setting screen W140 to be displayed on the screen by the controller 11 in response to pressing of the call button B25 on the job program call screen W130. Note that, a same configuration as that of the setting screen W20 according to the first embodiment is designated with a same reference sign, and description thereof is omitted when unnecessary.

The setting screen W140 includes job function-specific tabs T11 to T15, a setting value input/change area R19, a job program display area R73, a comparison setting value setting button B15, an OK button B17, and a cancel button B19.

The setting value input/change area R19 is an area that accepts input/change of a setting value pertaining to job execution. When a desired job program is selected via the job program call screen W130 in FIGS. 18A and 18B, and the call button B25 is pressed, the controller 11 reflects and displays, in the setting value input/change area R19, a content of a setting value pertaining to setting history information of the selected job program.

By checking a setting value of setting history information displayed in the setting value input/change area R19, the user can recognize a setting value pertaining to job execution. For example, FIG. 19 illustrates a scene in which the job program No. 2 "JP No. 2" is selected, and a setting value content of setting history information associated therewith is displayed. Specifically, the example is an example in which a setting value item: a setting value of color mode is "full color", a setting value item: a setting value of the number of copies is "100 copies", a setting value item: a setting value of paper (document) size is "A4 (automatic)", and a setting value item: a setting value of paper type is "plain paper (automatic, A4)", a setting value item: a setting value of copy density is "automatic", and a setting value item: a setting value of zoom magnification is "100%" are displayed as setting values.

Note that, other setting values (e.g., double-sided printing, N-Up printing, fit page, finishing function, and the like) can be displayed by pressing a "special function" button within the setting value input/change area R19.

The job program display area R73 is a display area that displays a job program number associated with a job program called by the user via the job program call screen W130. Herein, an associated area is displayed in a dark mode in such a way as to easily understand that the job program pertaining to the job program No. 2 "JP No. 2" is selected by the user.

Next, a comparison setting value setting screen W150 to be displayed on the screen by the controller 11 in response to pressing of the comparison setting value setting button B15 is described using FIGS. 20A to 20D.

The comparison setting value setting screen W150 according to the second embodiment accepts selection, determination, and the like of a setting value for use in comparison between a setting value pertaining to a newly executed job and a setting value pertaining to setting history information of a selected job program.

The comparison setting value setting screen W150 includes a first setting value input tab T17, a second setting value input tab T19, a display setting tab T25, a setting history tab T27, a specific setting value number display area R23, an OK button B21, and a cancel button B23.

Figure 20A:
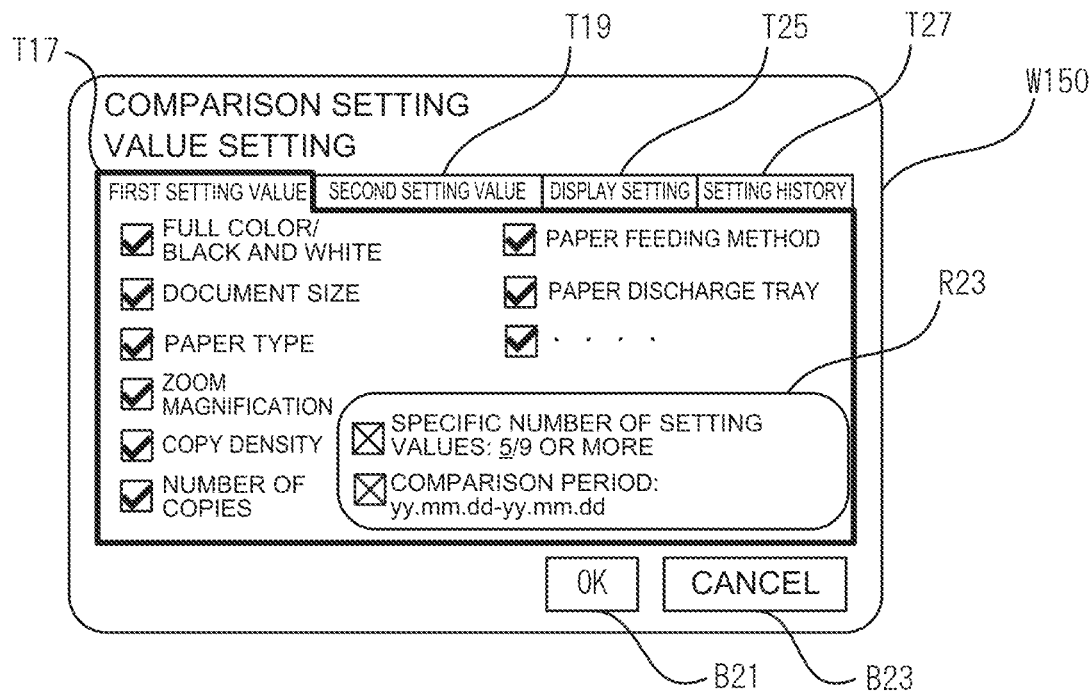
FIGS. 20A to 20D are diagrams illustrating an operation example of the multifunction machine according to the second embodiment.
Figure 20B:
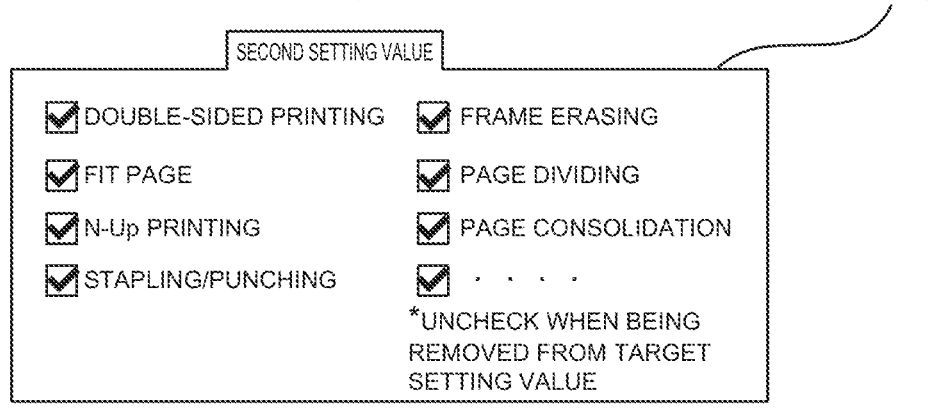

Note that, the comparison setting value setting screen W150 can have a substantially same configuration as that of the comparison setting value setting screen W30 according to the first embodiment. For example, FIG. 20A is a diagram illustrating a configuration example of the first setting value input tab T17 on the comparison setting value setting screen W150, and is equivalent to a configuration example of the first setting value input tab T17 according to the first embodiment in FIG. 10A. Also, FIG. 20B is a diagram illustrating a configuration example of the second setting value input tab T19, and is equivalent to a configuration example of the second setting value input tab T19 according to the first embodiment in FIG. 10B.

Figure 20C:
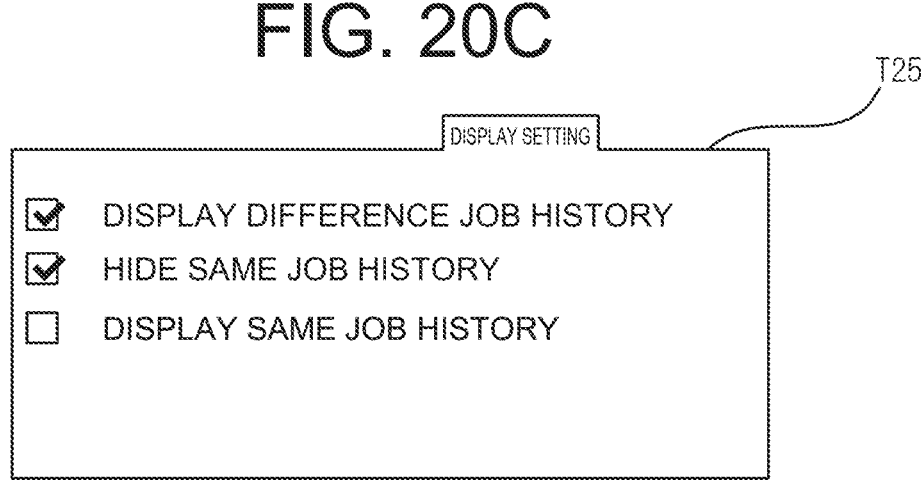
Figure 20D:
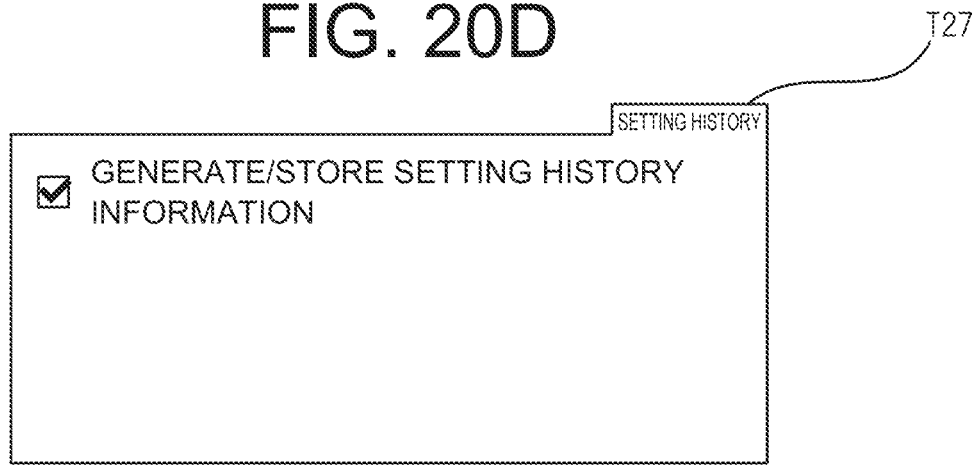

The display setting tab T25 accepts settings pertaining to display of a job history described in FIGS. 16 and 17. FIG. 20C is a configuration example of display settings of a job history. In step S240 in FIG. 16, when a job history including a difference in setting values (changed setting value) pertaining to job execution is displayed, the user adds a check to "Display a difference job history". When a setting value pertaining to job execution is not changed, and a job history is not displayed (step S250 in FIG. 17; No), the user adds a check to "Hide the same job history".

When a setting value pertaining to job execution is not changed, but a job history is displayed (step S250 in FIG. 17; Yes), or when a setting value pertaining to job execution is not changed, it is initially set not to display a job history, but settings are changed to display a job history later, the user adds a check to "Display the same job history".

When a setting value pertaining to job execution is not changed, the setting history tab T27 accepts a setting input as to whether to generate and store setting history information pertaining to a new job. When setting history information pertaining to a job executed with a same setting value as a setting value pertaining to setting history information of a job program is generated and stored, the user adds a check to "Generate and store setting history information".

Figure 21:
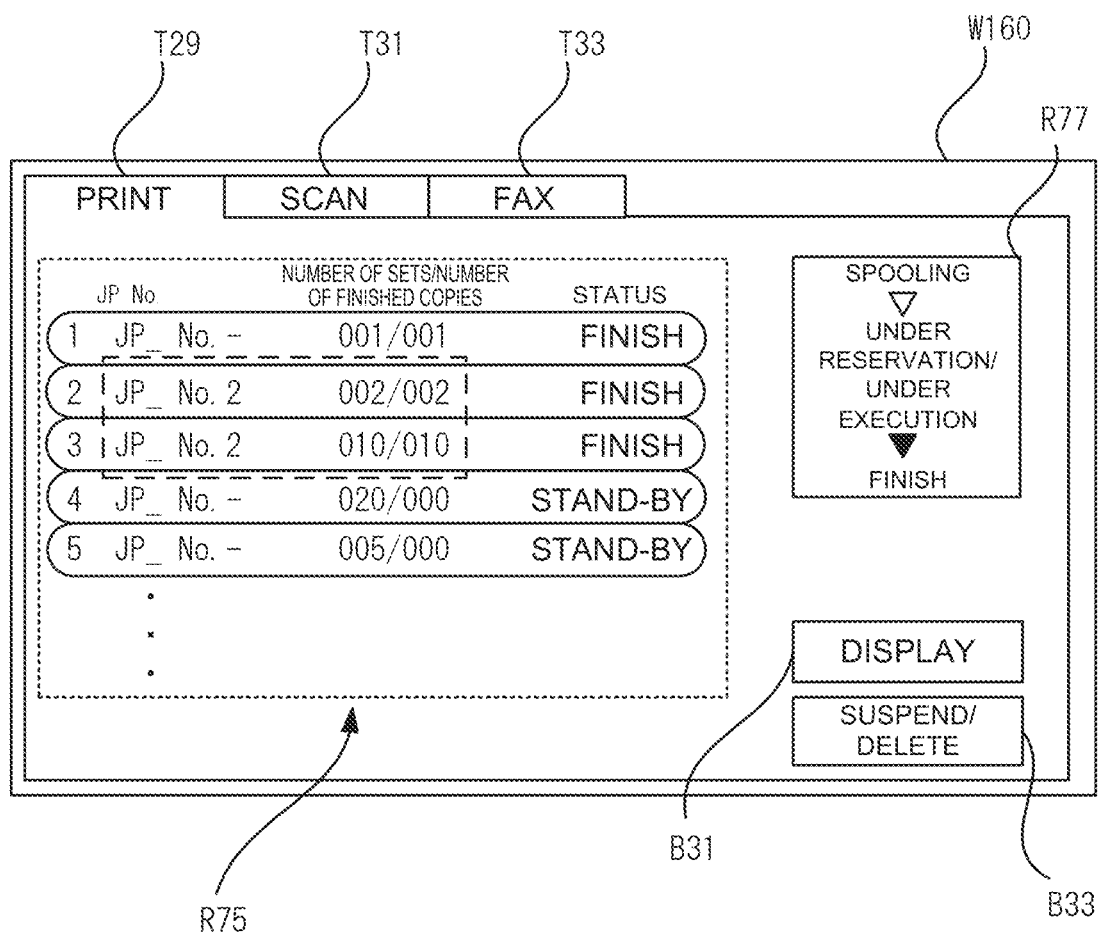
FIG. 21 is a diagram illustrating an operation example of the multifunction machine according to the second embodiment.

FIG. 21 is a configuration example of a job history display screen. A job history screen W160 includes a print tab T29, a scan tab T31, a fax tab T33, a job history display area R75, a status display area R77, a display button 31, and a suspend/delete button B33.

The print tab T29, the scan tab T31, and the fax tab T33 are tabs that accept switching of displaying a job history for each job function of a print job, a scan job, and a fax job. By selecting one of the print tab T29, the scan tab T31, and the fax tab T33, the user can display a job history of a job executed based on each job function. FIG. 21 is a configuration example in which a job history pertaining to a print job is displayed.

The job history display area R75 is an area in which job histories of jobs executed by execution of a job program are arranged in parallel in the order of execution. The job history display area R75 is a display example, when a check is added to "Display a difference job history" in the display setting tab T25 of the comparison setting value setting screen W150 in FIGS. 20A to 20D. In this case, a job having the job No. 3 represents a newly execution job based on a job program having the job No. 2 (JP_No. 2). In this case, the controller 11 displays, as a difference in setting values (changed setting value), which is an item to be displayed in a job history, the job program name (JP_No. 2) and the number of print copies (number of sets/number of finished copies) (within the dotted frame in FIGS. 20A to 20D).

The status display area R77 is a configuration example of a display area that displays an execution status of a job pertaining to a job program. A job execution status can be expressed by displaying a job execution stage in three stages: spooling, under reservation/under execution, and finishing, and displaying an actual job execution status by an arrow display state. An example in FIG. 21 illustrates that a job has finished, as a job execution status.

The display button B31 accepts a display input of setting history information of a job program. For example, the controller 11 displays the setting screen W140 illustrated in FIG. 19 by receiving user's pressing of the display button B31.

The suspend/delete button B33 accepts an input of suspending execution of a job pertaining to a job program, or deleting a job from a job history.

Figure 22:
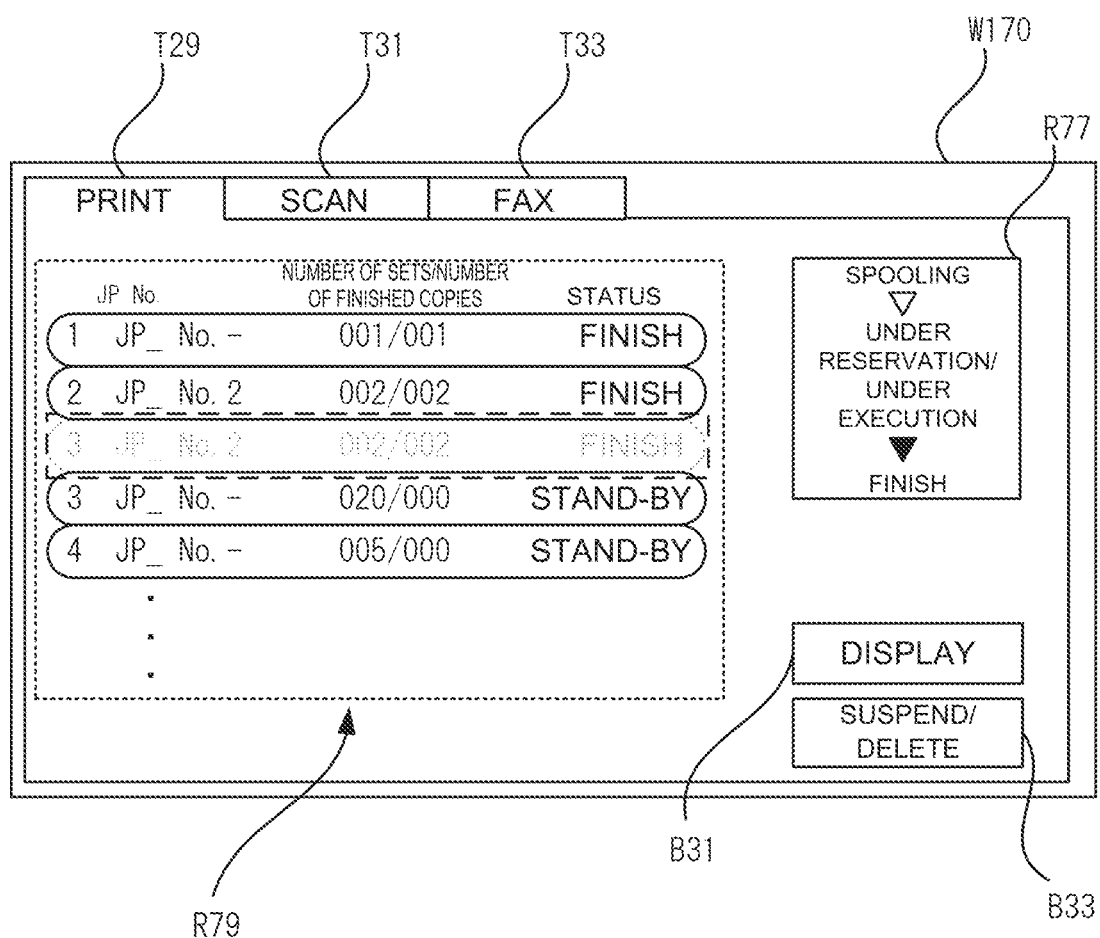
FIG. 22 is a diagram illustrating an operation example of the multifunction machine according to the second embodiment.

FIG. 22 is another configuration example of a display screen of a job history. A job history screen W170 includes a job history display area R79 that displays a job history in a display format different from that of the job history display area R75 on the job history screen W160 illustrated in FIG. 21.

The job history display area R79 is an area in which job histories of jobs executed by execution of a job program are arranged in parallel in the order of execution. The job history display area R79 is a display example, when a check is added to "Hide the same job history" in the display setting tab T25 of the comparison setting value setting screen W150 in FIGS. 20A to 20D. In this case, a job having the job No. 3 surrounded by a dotted frame in FIGS. 20A to 20D represents a newly execution job based on the job program (JP_No. 2) having the job No. 2. In this case, the controller 11 does not display a job history, even when the job is an actually executed job. Note that, a job history pertaining to execution of the same job surrounded by the dotted frame in FIGS. 20A to 20D is not actually displayed, but is made visible to facilitate understanding.

Figure 23:
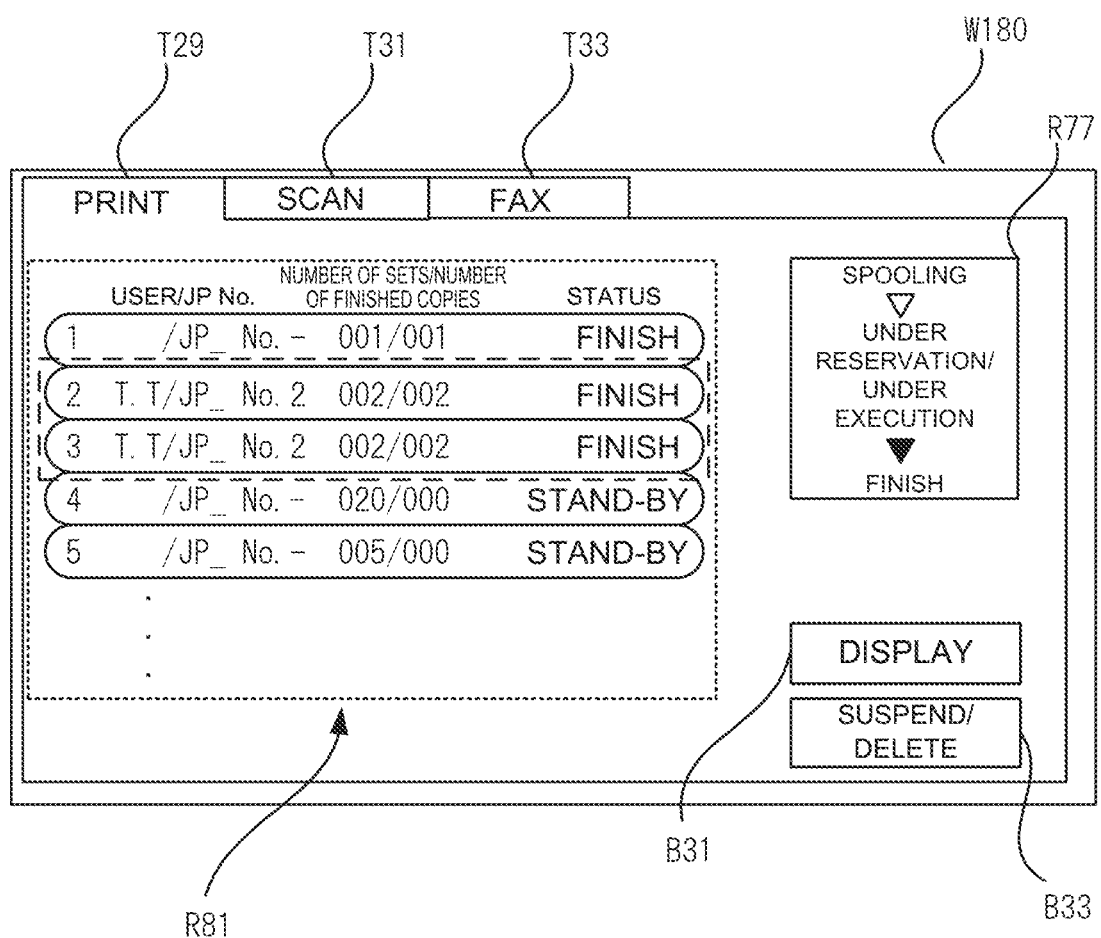
FIG. 23 is a diagram illustrating an operation example of the multifunction machine according to the second embodiment.

FIG. 23 is another configuration example of a display screen of a job history. A job history screen W180 includes a job history display area R81 that displays a job history in a display format different from that of the job history display area R75 on the job history screen W160 illustrated in FIG. 21.

The job history display area R81 is an area in which job histories of jobs executed by execution of a job program are arranged in parallel in the order of execution. The job history display area R81 is a display example, when a check is added to "Display the same job history" in the display setting tab T25 of the comparison setting value setting screen W150 in FIGS. 20A to 20D. In this case, a job having the job No. 3 surrounded by a dotted frame in FIGS. 20A to 20D represents a newly execution job based on the job program (JP_No. 2) having the job No. 2. In this case, the controller 11 displays the job program name (JP_No. 2) and the name of the executing user, as items to be displayed in the job history (within the dotted frame in FIGS. 20A to 20D).

As described above, in the second embodiment, when a new job is executed, based on setting history information pertaining to an already executed job selected via a job program, a display format of a job history pertaining to the new job is determined by a determination result as to whether a setting value pertaining to execution of the job and a setting value pertaining to setting history information of the already executed job are the same. Therefore, the user can use a job history pertaining to a desired job without fail.

3. Third Embodiment

A third embodiment describes a multifunction machine provided with a configuration in which a setting value pertaining to setting history information is automatically acquired. In the third embodiment, an automatic paper selection APS) function is described, as a configuration example in which a setting value is automatically acquired. In description of the third embodiment, a same functional unit and processing as those in the first embodiment are designated with a same reference sign, and description thereof is omitted.

3.1. Functional Configuration

Figure 24:
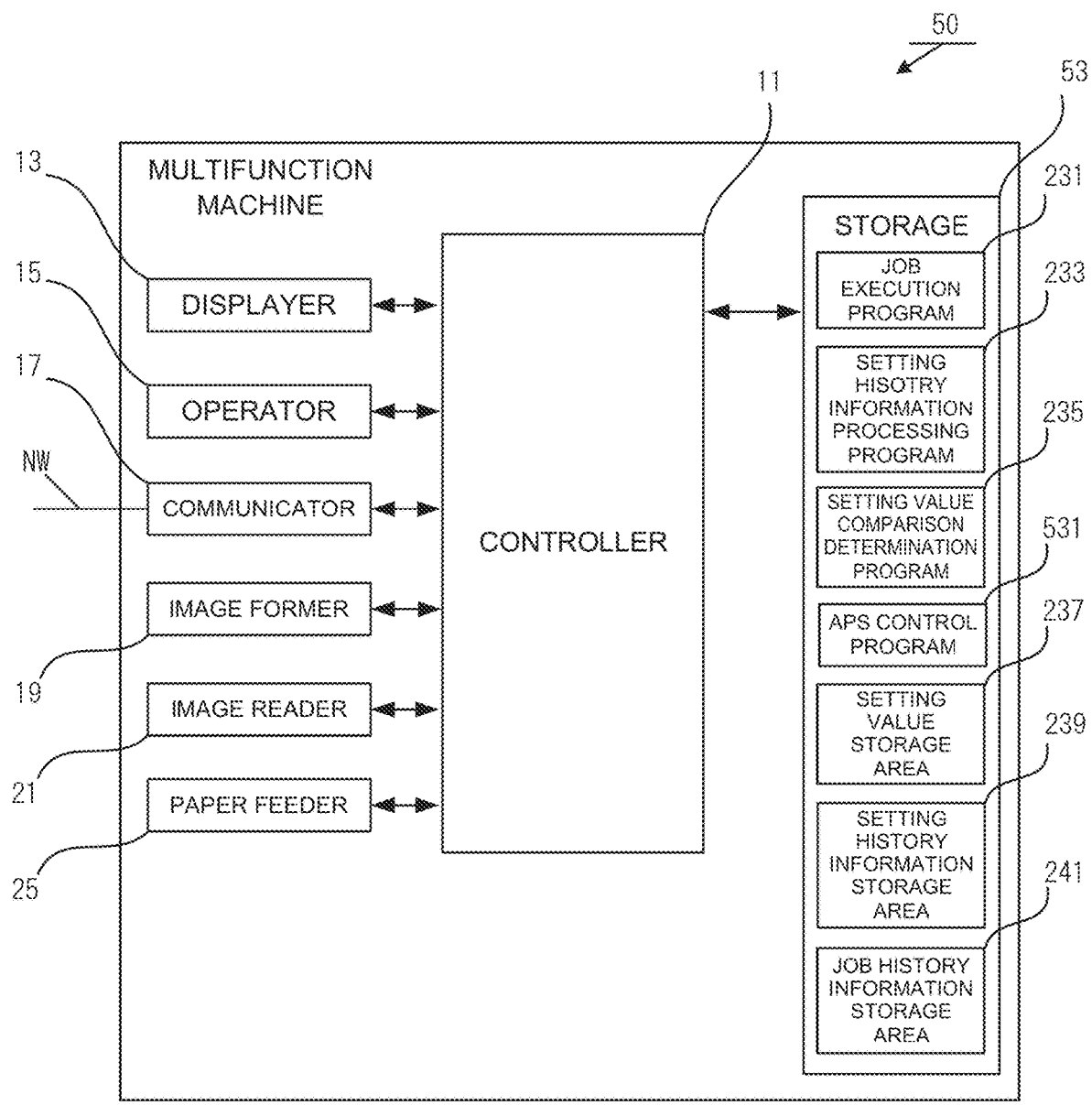
FIG. 24 is a functional configuration diagram of a multifunction machine according to a third embodiment.

FIG. 24 is a diagram illustrating a functional configuration of a multifunction machine 50 according to the third embodiment. The multifunction machine 50 according to the third embodiment is provided with a storage 53 instead of the storage 23 of the multifunction machine 10.

In the third embodiment, the storage 53 stores a job execution program 231, a setting history information processing program 233, a setting value comparison determination program 235, and an APS control program 531, and secures a setting value storage area 237, a setting history information storage area 239, and a job history information storage area 241.

The APS control program 531 is a program to be read by a controller 11 in order to automatically determine a tray in which paper in conformity with a document size is accommodated based on a setting value of the document size and the like, in a case where a plurality of trays that individually accommodate paper of different sizes such as A4 size, B5 size, and A3 size are mounted as a paper feeder 25 of the multifunction machine 50. By reading the APS control program 531, the controller 11 controls various sensors for determining an unillustrated document size, and each unit such as an automatic paper feeding mechanism.

3.2 Flow of Processing

Figure 25:
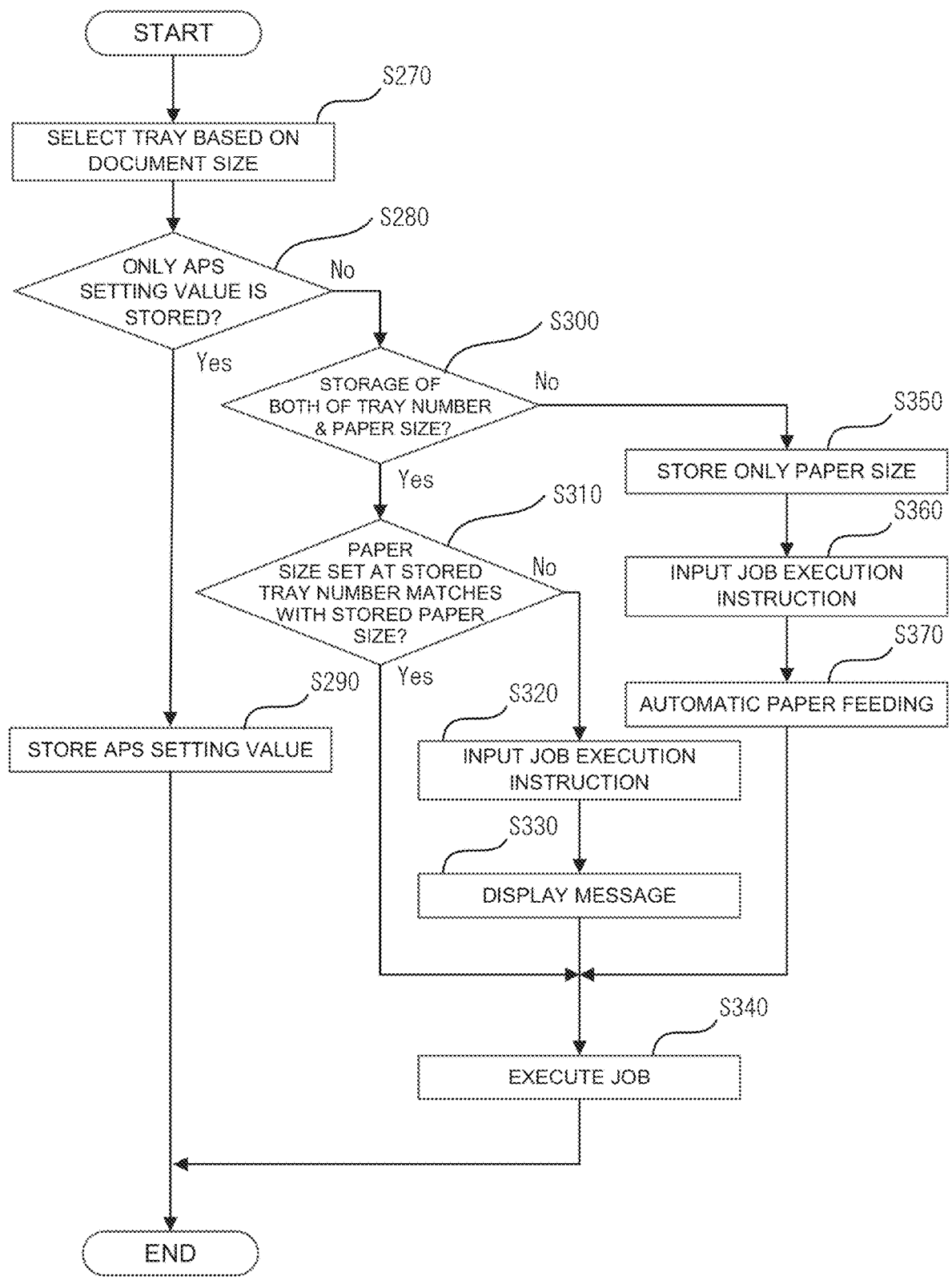
FIG. 25 is a flowchart illustrating a flow of processing of the multifunction machine according to the third embodiment.

Next, a flow of processing according to the third embodiment is described using FIG. 25.

In the processing described in FIG. 25, processing after step S300 is equivalent to processing pertaining to job execution using setting history information. Processing of step S270 and step S280 may be processing pertaining to job execution without using setting history information, or may be processing pertaining to job execution using setting history information.

In step S270, when a tray is automatically selected based on a document size by the APS function (step S270), the controller 11 determines whether storing only an APS setting value is selected by the user. Herein, storing only an APS setting value means, for example, storing a basic setting value pertaining to APS settings, such as whether APS settings are enabled or disabled, and not storing a setting value pertaining to the tray number, a paper size, and the like. Note that, selection as to whether to store only an APS setting value can be made, for example, via a comparison setting value setting screen to be described in the following drawing.

When storing only an APS setting value is selected by the user (step S280; Yes), the controller 11 stores the APS setting value (step S290), and ends the processing.

On the other hand, when storing only an APS setting value is not selected by the user (step S280; No), the controller 11 checks whether both of the tray number and the paper size are to be stored as setting history information (step S300). Herein, when both of the tray number and the paper size are to be stored (step S300; Yes), the controller 11 checks whether the paper size set for the stored tray number and the stored paper size match (step S310).

Herein, when the paper size set for the stored tray number does not match with the stored paper size, specifically, when paper of a different paper size is set in the tray associated with the stored tray number (step S310; No), and when an execution instruction of a job is input (step S320), the controller 11 displays a message prompting the user to select a tray (step S330).

When a desired tray is selected by the user, and paper is fed, the controller 11 executes the job (step S340), and ends the processing.

When the paper size set for the stored tray number and the stored paper size match (step S310; Yes), the controller 11 executes the job, and ends the processing.

On the other hand, when both of the tray number and the paper size are not stored (step S300; No), the controller 11 stores only the paper size (step S350).

When an execution instruction of a job is input (step S360), the controller 11 selects a tray in which the most suitable paper is accommodated based on the stored paper size, and automatically feeds paper from the tray (step S370). When the paper is fed by automatic feeding, the controller 11 executes the job (step S340), and ends the processing.

3.3 Operation Example

Figure 26A:
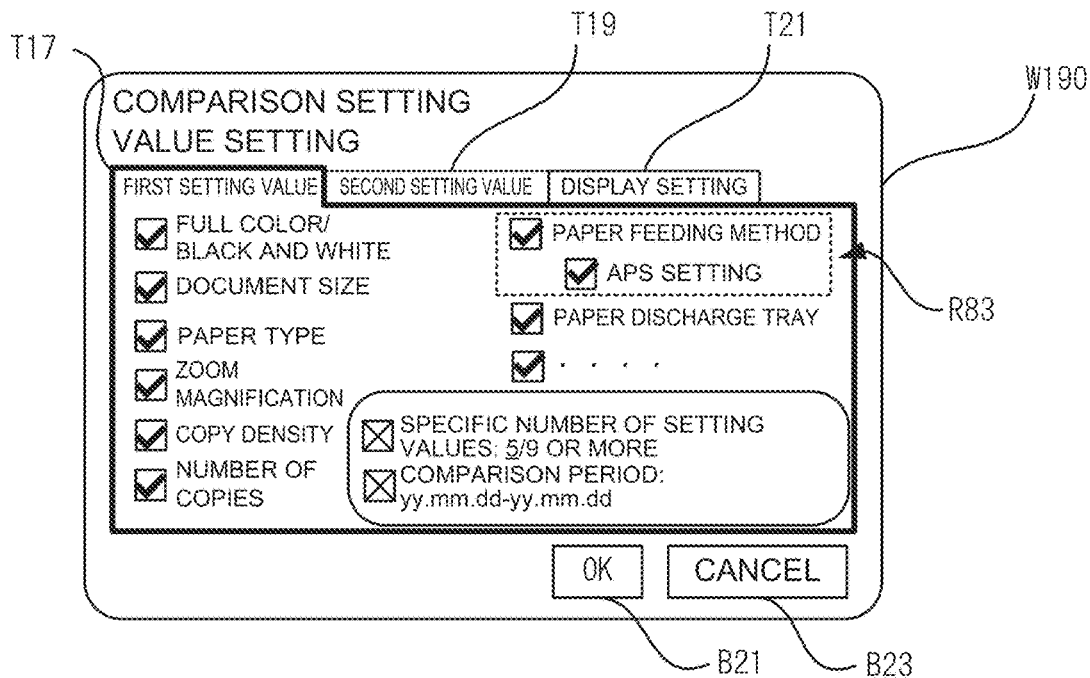
FIGS. 26A and 26B are diagrams illustrating an operation example of the multifunction machine according to the third embodiment.

Next, a configuration example according to the third embodiment is described. FIG. 26A is a configuration example of a comparison setting value setting screen W190 that accepts selection of APS settings by a user. The comparison setting value setting screen W190 can be configured to be equivalent to the comparison setting value setting screen W30 according to the first embodiment. An APS setting check box area R83 that accepts selection of APS settings under a paper feeding method is provided in a first setting value input tab T17 on the comparison setting value setting screen W190 according to the third embodiment.

Figure 26B:
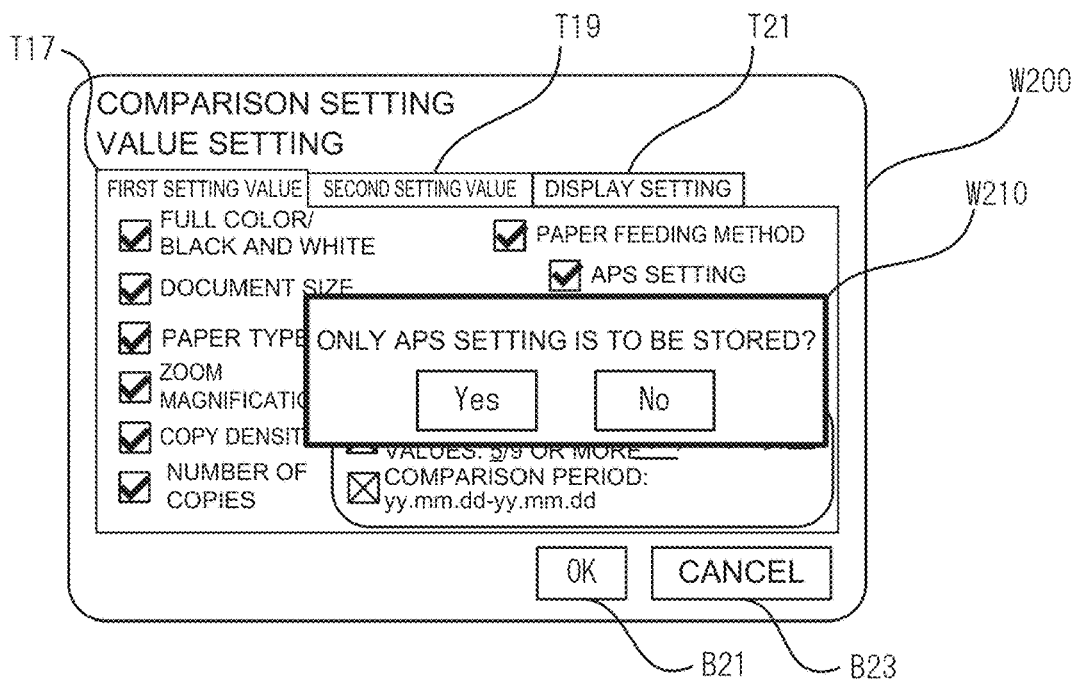

FIG. 26B is a configuration example of a confirmation screen to be displayed by the controller 11, when a check is added to a check box in the APS setting check box area R83 by the user in FIG. 26A. Note that, the present operation example is an operation example equivalent to processing of step S290 in FIG. 25. The user can store only APS settings by selecting "Yes" with respect to a check item "Do you want only APS settings to be stored?" via the confirmation screen.

Figure 27:
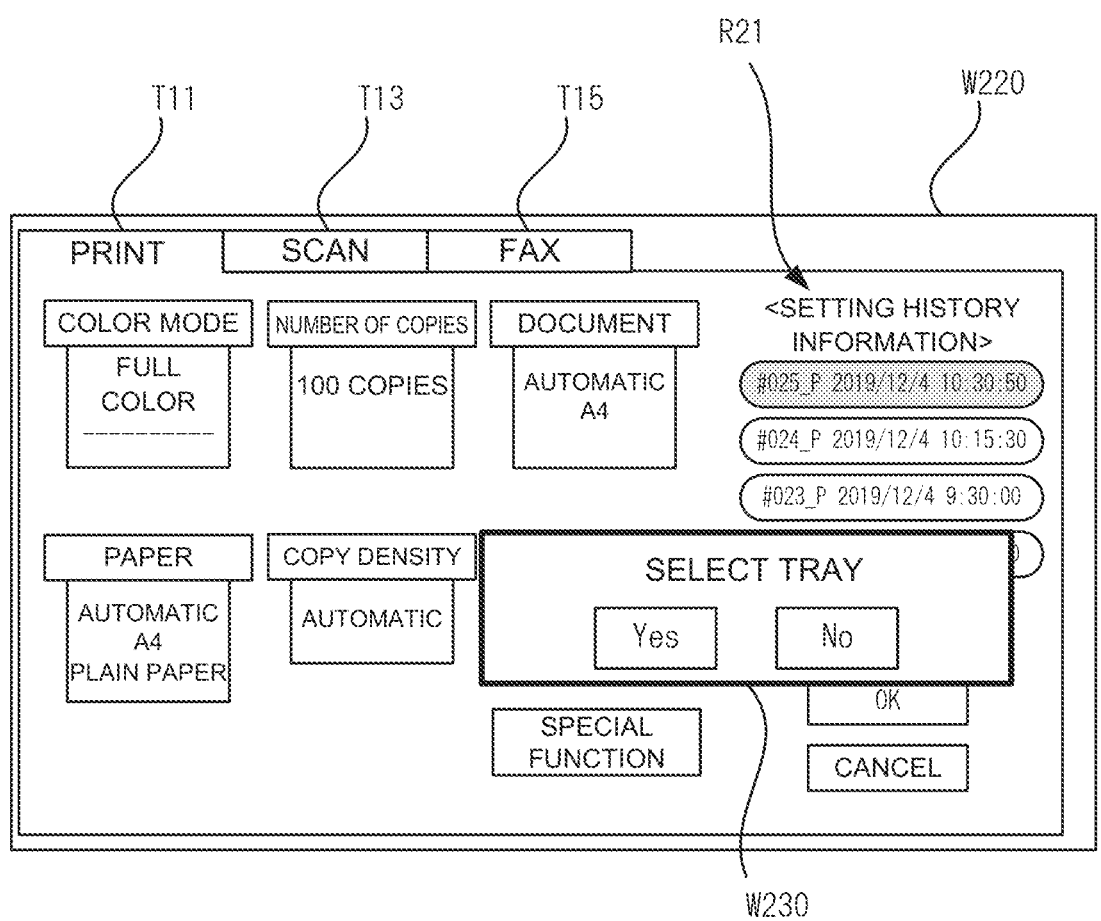
FIG. 27 is a diagram illustrating an operation example of the multifunction machine according to the third embodiment.

FIG. 27 is a configuration example of a tray selection screen to be displayed on the screen to a user, when the controller 11 stores only a paper size, and executes a job based on setting history information. Note that, the present operation example is an operation example equivalent to processing of step S350 in FIG. 25. The user can execute a job with the most suitable paper size by selecting or inputting a desired tray number via the tray selection screen.

As described above, according to the third embodiment, in a multifunction machine configured to automatically acquire a setting value, a user can acquire an execution result of a desired job by appropriately selecting processing depending on a storage status of setting history information of an acquired setting value.

The present invention is not limited to the above-described embodiments, and various changes are available. Specifically, embodiments to be acquired by appropriately combining modified technical means within a range that does not depart from the gist of the present invention are also included in the technical scope of the present invention.

In addition, although some of the above-described embodiments are described separately for convenience of explanation, it is needless to say that it is possible to combine and implement the embodiments within a technically possible range.

In addition, a program operating in each apparatus in the embodiments is a program (a program causing a computer to function) that controls a CPU or the like in such a way as to achieve functions of the above-described embodiments. Information to be handled by these apparatuses is temporarily stored in a temporary storage device (e.g., RAM) at the time of processing, and thereafter, is stored in a storage device such as various read only memories (ROMs), and HDDs, and is read and corrected/written by the CPU as necessary.

Herein, a recording medium for storing the program may be any of a semiconductor medium (e.g., a ROM, a non-volatile memory card, and the like), an optical recording medium/magneto-optical recording medium (e.g., a digital versatile disc (DVD), a magneto optical disc (MO), a mini disc (MD), a compact disc (CD), a Blu-ray (registered trademark) disk (BD), and the like), or a magnetic recording medium (e.g., a magnetic tape, a flexible disk, and the like). In addition, not only functions of the above-described embodiments are achieved by executing a loaded program, but also functions of the present invention may be achieved by processing the program jointly with an operating system, other application program, or the like, based on an instruction of the program.

Further, in a case of distributing the program in the market, the program can be stored in a portable recording medium and distributed, or can be transferred to a server computer connected via a network such as the Internet. In this case, it is needless to say that a storage device of the server computer is also included in the present invention.

What is claimed is:

1. An image forming apparatus that executes a job, based on a setting value, and is operative to store a history of the job, as a job history, the image forming apparatus comprising:
   a storage that stores the setting value of the executed job, as setting history information;
   a displayer that displays a selection screen for selecting the setting history information stored in the storage; and
   a controller that reads the setting value included in the selected setting history information, wherein
   the controller determines whether to display setting history information of a newly executed job based on a comparison result between a setting value pertaining to the newly executed job and the setting value included in the selected setting history information and generates the setting history information pertaining to the newly executed job based on the setting value pertaining to the newly executed job not being the same as the setting value included in the selected setting history information.

2. The image forming apparatus according to claim 1, wherein
   when there is no difference between the setting value pertaining to the newly executed job and the setting value included in the setting history information, the controller determines not to display the setting history information of the newly executed job.

3. The image forming apparatus according to claim 1, wherein
   when a user pertaining to the newly executed job and a user pertaining to execution of the selected setting history information are the same, the controller determines not to display the setting history information of the newly executed job.

4. The image forming apparatus according to claim 1, wherein
   when a user pertaining to the newly executed job and a user pertaining to execution of the selected setting history information are the same, the controller does not store the setting value pertaining to the newly executed job.

5. The image forming apparatus according to claim 1, wherein
when there is a difference between the setting value pertaining to the newly executed job and the setting value included in the selected setting history information, the controller determines to display the setting history information of the newly executed job.

6. The image forming apparatus according to claim 5, wherein
the displayer displays the difference.

7. An image forming apparatus that executes a job, based on a setting value, and is operative to store a history of the job, as a job history, the image forming apparatus comprising:
a storage that stores the setting value of the executed job, as batch setting history information;
a displayer that displays a selection screen for selecting the batch setting history information stored in the storage; and
a controller that reads the setting value included in the selected batch setting history information, wherein
the controller determines whether to display setting history information of a newly executed job based on a comparison result between a setting value pertaining to the newly executed job and the setting value included in the selected batch setting history information and generates the setting history information pertaining to the newly executed job based on the setting value pertaining to the newly executed job not being the same as the setting value included in the selected batch setting history information.

8. The image forming apparatus according to claim 1, wherein
when executing a new job based on the setting value stored in the storage, the controller acquires a setting value pertaining to execution of the new job, and when there is a difference between the acquired setting value and the setting value stored in the storage, the controller informs a user prior to the execution of the new job.

9. The image forming apparatus according to claim 7, wherein
when executing a new job based on the setting value stored in the storage, the controller acquires a setting value pertaining to execution of the new job, and when there is a difference between the acquired setting value and the setting value stored in the storage, the controller informs a user prior to the execution of the new job.

10. A control method for an image forming apparatus that executes a job, based on a setting value, and is operative to store a history of the job, as a job history, the control method comprising:
storing the setting value of the executed job, as setting history information;
displaying a selection screen for selecting the setting history information stored in the storage; and
controlling to read the setting value included in the selected setting history information, wherein
the controlling includes determining whether to display setting history information of a newly executed job based on a comparison result between a setting value pertaining to the newly executed job and the setting value included in the selected setting history information and generating the setting history information pertaining to the newly executed job based on the setting value pertaining to the newly executed job not being the same as the setting value included in the selected setting history information.

11. A control method for an image forming apparatus that executes a job, based on a setting value, and is operative to store a history of the job, as a job history, the control method comprising:
storing the setting value of the executed job, as batch setting history information;
displaying a selection screen for selecting the batch setting history information stored in the storage; and
controlling to read the setting value included in the selected batch setting history information, wherein
the controlling includes determining whether to display setting history information of a newly executed job based on a comparison result between a setting value pertaining to the newly executed job and the setting value included in the selected batch setting history information and generating the setting history information pertaining to the newly executed job based on the setting value pertaining to the newly executed job not being the same as the setting value included in the selected batch setting history information.

12. The image forming apparatus according to claim 1, wherein
the controller performs display processing with respect to the setting history information pertaining to the newly executed job when the setting value pertaining to the newly executed job and the setting value included in the selected setting history information are the same.

13. The image forming apparatus according to claim 12, wherein
the display processing includes an act of generating and storing one of two pieces of setting history information in which setting values are the same, an act of doing nothing, and an act of not displaying the setting history information.

* * * * *